United States Patent
Slaton et al.

(10) Patent No.: US 10,055,908 B2
(45) Date of Patent: Aug. 21, 2018

(54) REAL-TIME DRIVER REWARD DISPLAY SYSTEM AND METHOD

(71) Applicants: Zachary Slaton, Lynnwood, WA (US); Steven Karl Jahns, Bellingham, WA (US); Josef Lotz, Monroe, WA (US); Jennifer Kim, Redmond, WA (US); Jason Morrow, Seattle, WA (US); John William Arthur Doll, Renton, WA (US)

(72) Inventors: Zachary Slaton, Lynnwood, WA (US); Steven Karl Jahns, Bellingham, WA (US); Josef Lotz, Monroe, WA (US); Jennifer Kim, Redmond, WA (US); Jason Morrow, Seattle, WA (US); John William Arthur Doll, Renton, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 15/206,151

(22) Filed: Jul. 8, 2016

(65) Prior Publication Data

US 2017/0011569 A1    Jan. 12, 2017

Related U.S. Application Data

(63) Continuation of application No. 14/020,638, filed on Sep. 6, 2013, now Pat. No. 9,393,868.

(Continued)

(51) Int. Cl.
G07C 5/08 (2006.01)
B60K 31/04 (2006.01)
(Continued)

(52) U.S. Cl.
CPC ............ *G07C 5/0825* (2013.01); *B60K 31/00* (2013.01); *B60K 31/04* (2013.01); *B60K 31/042* (2013.01);
(Continued)

(58) Field of Classification Search
CPC ...... B60K 31/00; B60K 31/04; B60K 31/042; B60W 40/08; B60W 40/09; B60W 2540/30; B60W 2710/065; Y02T 10/52
See application file for complete search history.

(56) References Cited

U.S. PATENT DOCUMENTS 5,954,617 A    9/1999    Horgan et al.
6,026,784 A    2/2000    Weisman et al.
(Continued)

OTHER PUBLICATIONS

"Driver Reward—Overview," © 2008-2010 Cummins Inc., Columbus, Ind., <http://www.powerspec.cummins.com/site/help/eng_info/ISX/Driver%20Reward/drwd_oview.htm> [retrieved Dec. 4, 2013], 1 page.

*Primary Examiner* — Andrew Bee
(74) *Attorney, Agent, or Firm* — Christensen O'Connor Johnson Kindness PLLC

(57) ABSTRACT

A method and system for improved driver reward display functionality. A driver reward is calculated based on inputs, such as freight fuel, fuel economy, and % idle. The driver reward system configures and displays a primary driver reward image for various menu selections. The primary driver reward image is configured to indicate whether the driver reward is at full penalty, partial penalty, neutral, partial bonus, or full bonus. The image is displayed in one color if above an expected value and another color if below the expected level. Images that indicate to the operator of the vehicle the impact of each input on the overall driver reward or whether each input is improving or worsening may be (Continued)

displayed. A secondary driver reward image may also be displayed to indicate a specific bonus or penalty in miles per hour and speed limit.

21 Claims, 20 Drawing Sheets

Related U.S. Application Data

(60) Provisional application No. 61/800,622, filed on Mar. 15, 2013.

(51) Int. Cl.
*B60W 40/08* (2012.01)
*B60W 40/09* (2012.01)
*B60K 31/00* (2006.01)
*B60W 50/14* (2012.01)

(52) U.S. Cl.
CPC ............ *B60W 40/08* (2013.01); *B60W 40/09* (2013.01); *B60K 2350/967* (2013.01); *B60W 2050/146* (2013.01); *B60W 2520/10* (2013.01); *B60W 2540/30* (2013.01); *B60W 2710/065* (2013.01); *Y02T 10/52* (2013.01); *Y02T 10/84* (2013.01)

(56) References Cited

U.S. PATENT DOCUMENTS

| | | | |
|---|---|---|---|
| 6,366,848 | B1 | 4/2002 | Gustavsson |
| 6,370,454 | B1 | 4/2002 | Moore |
| 7,512,477 | B2 * | 3/2009 | Quigley ............. F02D 41/1406 |
| | | | 701/103 |
| 8,116,971 | B2 | 2/2012 | Chen et al. |
| 2009/0284361 | A1 | 11/2009 | Boddie et al. |
| 2013/0273864 | A1 | 10/2013 | Helm |

\* cited by examiner

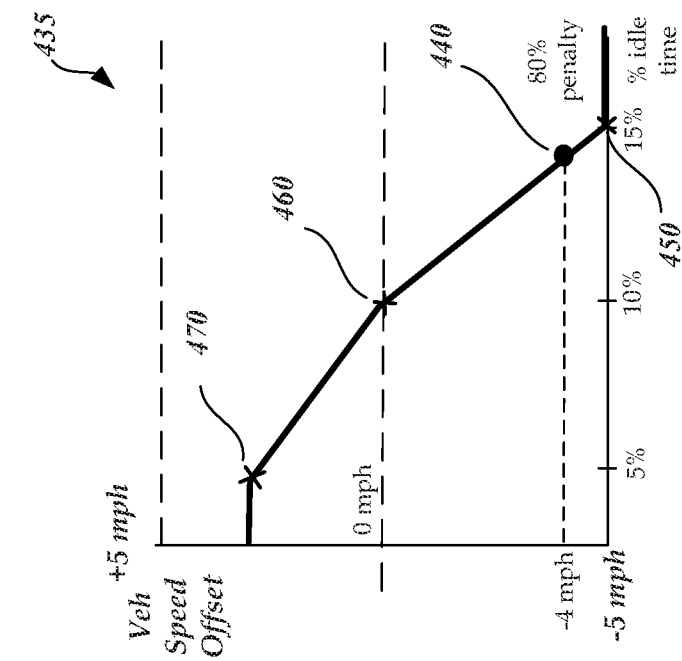
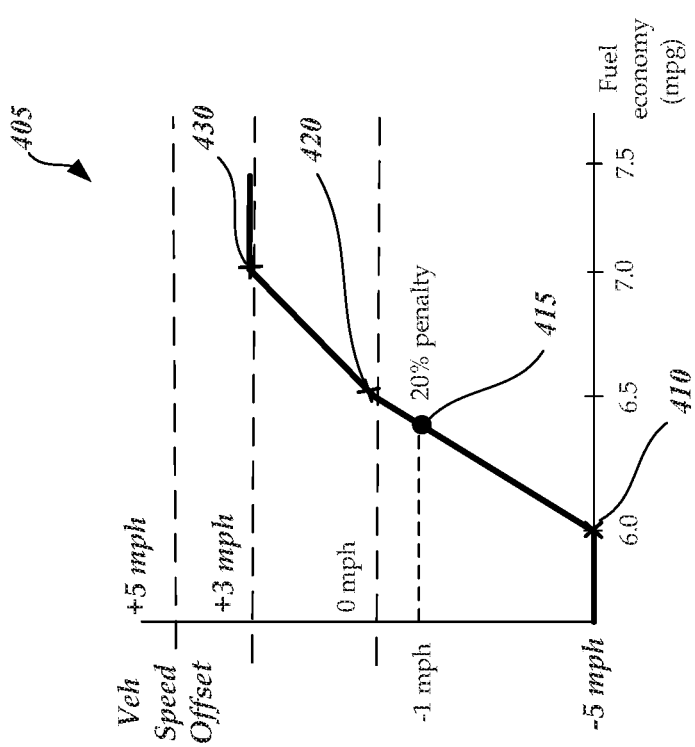
Fig. 4B.
Fig. 4A.

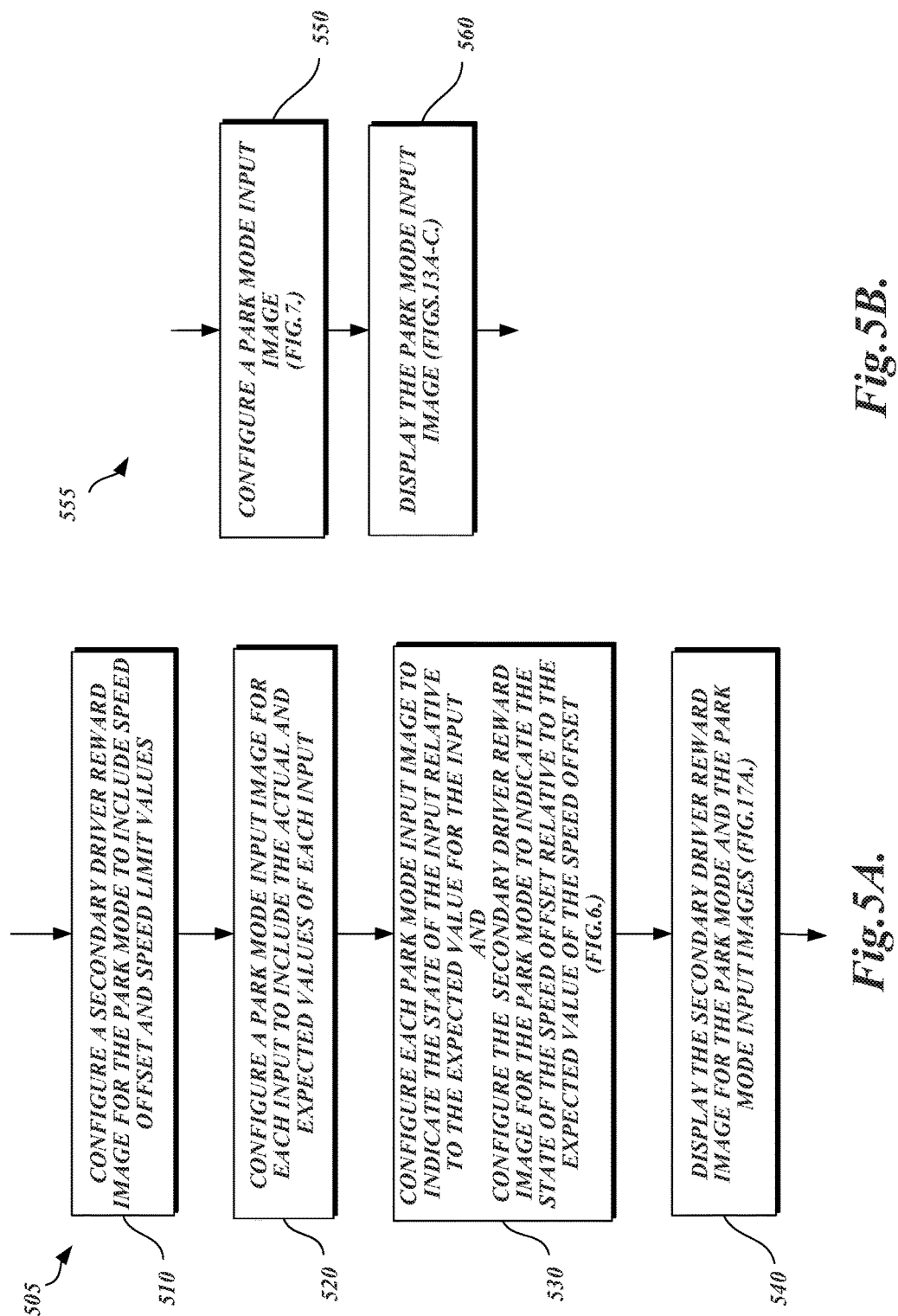

REAL-TIME DRIVER REWARD DISPLAY SYSTEM AND METHOD

CROSS-REFERENCES TO RELATED APPLICATIONS

This application is a continuation of application Ser. No. 14/020,638, filed Sep. 6, 2013, which claims the benefit of Provisional Patent Application No. 61/800,622, filed Mar. 15, 2013, the disclosures of which are hereby incorporated by reference herein in their entireties.

BACKGROUND

In recent years, systems for rewarding the drivers of vehicles, in particular light, medium, and heavy trucks, have been developed. A driver reward system is a system incorporated into a vehicle that provides rewards or penalties to an operator of a vehicle based on how their driving performance equates to expected driver performance based on criteria established (usually) by the owner of the vehicle. Examples of previously developed driver reward systems are disclosed in U.S. Pat. No. 6,026,784 (Weisman et al.) and U.S. Pat. No. 6,366,848 (Gustavsson).

Previously developed driver reward systems often assess driver performance to determine an overall driver reward score. The overall driver reward score is determined using complex formulas that consider criteria of concern for the owner of the vehicle, such as fuel economy and the amount of time a vehicle is idling. Driver rewards systems are designed to provide the operator of the vehicle, i.e., the truck driver, with a reward if performance expectations are exceeded. Driver reward systems may also penalize a driver if performance expectations are not met. An example of a reward is enabling an increase in the maximum speed at which the vehicle, i.e., the truck, can be driven. Conversely, a penalty is reducing the maximum speed at which the vehicle can be driven, thereby causing the operator to experience some delay. The purpose of providing rewards for drivers exceeding performance expectations and penalties for failing to meet performance expectations is to motivate drivers to improve their driving performance.

Although the purpose of previously developed driver reward systems is to improve driving performance, many lack functionality, in particular, the ability to communicate with drivers in real time in a manner such that drivers readily understand what aspects of their driving procedure results in the driver not improving his or her performance. In this regard, different trucks may utilize different formulas for improving performance because trucks have differences based on, for example, the engine, transmission, or gearing incorporated into a specific truck. Therefore, a specific driving procedure that is rewarded in one truck may be penalized in another truck.

Safety is a great concern in any driver training system that employs feedback. More specifically, fully loaded truck/trailer combinations often weigh upwards of 80,000 lbs. Such trucks in particular, but any truck in general, that employs a driver training system that provides driver feedback in a displayed manner, should be designed to minimize driver distraction by quickly conveying feedback, i.e., should be driver-friendly. In this regard, modern trucks have clusters of dash or gauges that require a driver's attention when driving. Because modern truck cabins contain numerous gauges and instrument clusters, only a limited amount of space is available to present additional information. Previously developed systems do not always take this concern into consideration, i.e., they are not as driver-friendly as they should be.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An improved driver reward system and method is disclosed. Data associated with a driver's operation of a vehicle, in particular a truck, is collected and analyzed to determine if the vehicle is being operated as expected. The driver is rewarded if the driver is operating the vehicle better than expected and penalized if the driver is operating the vehicle worse than expected. The driver reward system includes a computer processing system that includes a processor, memory, and a display. The memory stores data of the type collected that defines the expected operation of the vehicle and a program for causing the processor to analyze the collected driver data. The program causes the processor to analyze the collected data by comparing the collected driver data to the stored data that defines the expected operation of the vehicle. The result of the analysis is displayed on the display in a manner that allows the driver to determine in real time if the way the driver is operating the vehicle is as expected, better than expected, or worse than expected, and in a way that minimizes driver distraction by displaying a speed offset increase in a nominal speed value, called a bonus image, if the vehicle is being operated better than expected, and a speed offset decrease in the nominal speed value, called a penalty image, if the vehicle is being operated worse than expected. The states of the bonus and penalty images are conditioned in accordance with whether the display is a bonus display or a penalty display. Preferably, the conditioning is based on colors such that a bonus image is one color and a penalty image is another color.

In accordance with further features, the type of display is determined by whether the vehicle is in a drive mode of operation or a parked mode of operation.

In accordance with yet other features, the program also determines if the collected driver data shows that the driver's operation of the vehicle is improving or worsening, and the display includes an image showing whether the driver's operation of the vehicle is improving or worsening.

In accordance with other features, the image showing whether the driver's operation of the vehicle is improving or worsening is color-coded, such that the image is in one color if the driver's operation of the vehicle is improving and another color if the driver's operation of the vehicle is worsening. In addition, or alternatively, the image showing whether the driver's operation of the vehicle is improving or worsening includes arrows that point one direction if the driver's operation of the vehicle is improving, and in another direction if the driver's operation of the vehicle is worsening.

In accordance with further features, the data source of the driver's operation of the vehicle includes one or more of: (i) the units traveled by the vehicle per the amount of fuel consumed, such as miles per gallon or kilometers per liter; (ii) the amount of time the vehicle is idling; and (iii) the fuel consumption per freight weight consumed by the vehicle.

In accordance with yet other features of this invention, the program also causes the display to display an image that combines the nominal speed with either the speed offset increase or the speed offset decrease.

In accordance with still other features, the driver rewards system causes a display to display a plurality of pages including a driver reward page that includes the bonus or penalty images. A summary driver reward image is displayed on at least some of the plurality of pages other than the driver reward page. Preferably, the summary driver reward image includes an identification portion, such as a depiction of a driver, and a summary portion, which indicates whether the operation of the vehicle is above or below expected levels. Preferably, the summary portion indicates whether the operation of the vehicle is substantially above or substantially below expected levels, if the operation of the vehicle is substantially above or substantially below expected levels.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An improved driver reward system and method is disclosed. Data associated with a driver's operation of a vehicle, in particular a truck, is collected and analyzed to determine if the vehicle is being operated as expected. The driver is rewarded if the driver is operating the vehicle better than expected and penalized if the driver is operating the vehicle worse than expected. The driver reward system includes a computer processing system that includes a processor, memory, and a display. The memory stores data of the type collected that defines the expected operation of the vehicle and a program for causing the processor to analyze the collected driver data. The program causes the processor to analyze the collected data by comparing the collected driver data to the stored data that defines the expected operation of the vehicle. The result of the analysis is displayed on the display in a manner that allows the driver to determine in real time if the way the driver is operating the vehicle is as expected, better than expected, or worse than expected, and in a way that minimizes driver distraction by displaying a speed offset increase in a nominal speed value, called a bonus image, if the vehicle is being operated better than expected, and a speed offset decrease in the nominal speed value, called a penalty image, if the vehicle is being operated worse than expected. The states of the bonus and penalty images are conditioned in accordance with whether the display is a bonus display or a penalty display. Preferably, the conditioning is based on colors such that a bonus image is one color and a penalty image is another color.

In accordance with further features, the type of display is determined by whether the vehicle is in a drive mode of operation or a parked mode of operation.

In accordance with yet other features, the program also determines if the collected driver data shows that the driver's operation of the vehicle is improving or worsening, and the display includes an image showing whether the driver's operation of the vehicle is improving or worsening.

In accordance with other features, the image showing whether the driver's operation of the vehicle is improving or worsening is color-coded, such that the image is in one color if the driver's operation of the vehicle is improving and another color if the driver's operation of the vehicle is worsening. In addition, or alternatively, the image showing whether the driver's operation of the vehicle is improving or worsening includes arrows that point one direction if the driver's operation of the vehicle is improving, and in another direction if the driver's operation of the vehicle is worsening.

In accordance with further features, the data source of the driver's operation of the vehicle includes one or more of: (i) the units traveled by the vehicle per the amount of fuel consumed, such as miles per gallon or kilometers per liter; (ii) the amount of time the vehicle is idling; and (iii) the fuel consumption per freight weight consumed by the vehicle.

In accordance with yet other features of this invention, the program also causes the display to display an image that combines the nominal speed with either the speed offset increase or the speed offset decrease.

In accordance with still other features, the driver rewards system causes a display to display a plurality of pages including a driver reward page that includes the bonus or penalty images. A summary driver reward image is displayed on at least some of the plurality of pages other than the driver reward page. Preferably, the summary driver reward image includes an identification portion, such as a depiction of a driver, and a summary portion, which indicates whether the operation of the vehicle is above or below expected levels. Preferably, the summary portion indicates whether the operation of the vehicle is substantially above or substantially below expected levels, if the operation of the vehicle is substantially above or substantially below expected levels.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 4A and 4B are graphs illustrating exemplary relationships between expected, penalty, and bonus vehicle speed offsets for fuel economy and % idle time inputs, respectively;

FIG. 5A is a flow diagram of an exemplary park mode subroutine suitable for use in FIG. 2;

FIG. 5B is a flow diagram of an alternative exemplary park mode subroutine suitable for use in FIG. 2;

DETAILED DESCRIPTION

A system and method for improving the display of driver reward information to an operator of a vehicle, such as a truck driver, are disclosed. The disclosed system and method enable the driver to quickly ascertain a current driver reward score as well as more detailed information related to helping the driver to improve his or her score. The system configures images to quickly communicate driver reward trend information to a driver. The type of image displayed and the information contained in the image depends on whether the vehicle is moving or stationary because a driver has more time to look at a display when a vehicle is stationary.

Figure 1:
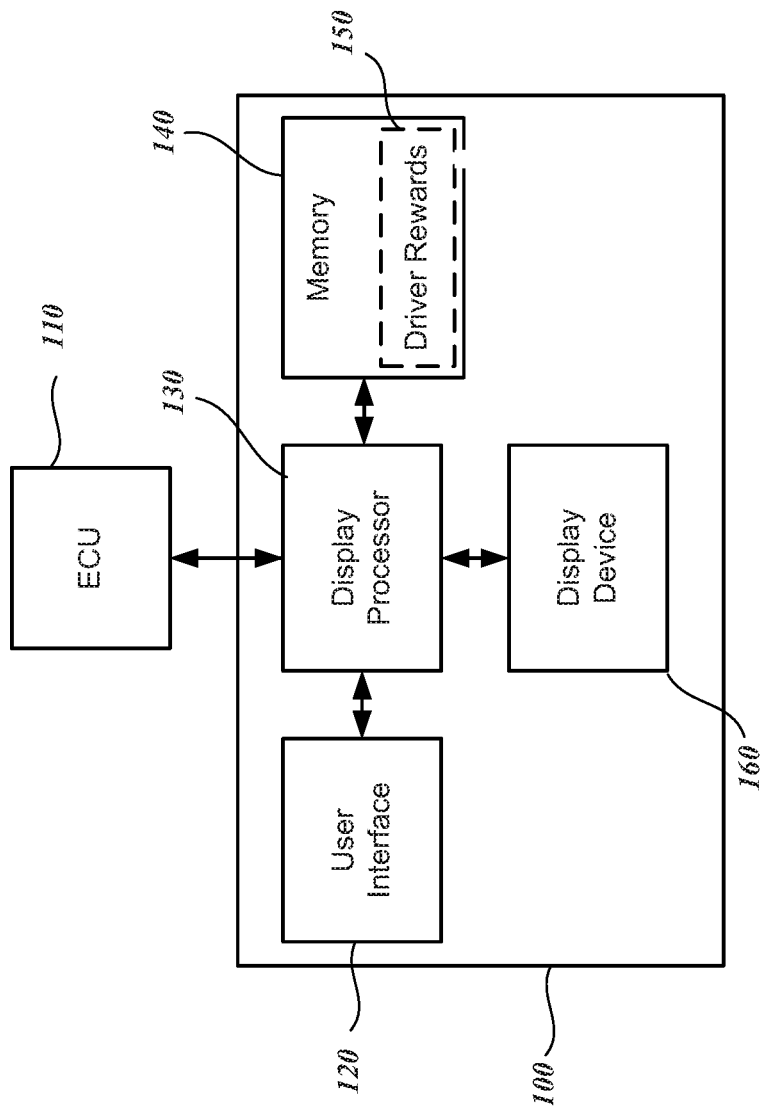
FIG. 1 illustrates a simplified computing system suitable for carrying out embodiments of the disclosed subject matter.

FIG. 1 illustrates a simplified generic computing system 100 suitable for carrying out disclosed embodiments. The computing system 100 is only one example of a suitable operating environment and is not intended to suggest any limitation as to the scope of use or functionality of the disclosed embodiments. The illustrated computing system 100 includes a user interface 120, a display processor 130, a memory 140, and a display device 160. The memory 140 includes one or more forms of computer-readable storage media. Computer-readable storage media is any currently available or later developed media suitable for storing programs and data accessible by one or more computer components, such as the display processor 130 included in FIG. 1. Computer-readable storage media may be removable or non-removable and may be volatile or nonvolatile. Examples of computer-readable storage media may include hard drives as well as RAM, ROM, EEPROM, and flash types of memory.

The user interface 120 may include any device that allows a user to interact with the display processor 130. In some embodiments, the user interface 120 may be a touch screen incorporated into the display device 160. Preferably, the user interface 120 allows a user to scroll through various display options and select particular options using a mouse-type or other conventional cursor control device, or a touch screen. The display options may be organized as a menu with sub-menus, one or more of which is a driver reward display option. In response to the selection of the driver reward display option, the system 100 configures and displays one or more images containing driver reward information. If desired, the one or more images containing driver reward information may also contain other driver information.

Examples of display device 160 may be any suitable display capable of displaying digital images. The currently preferred display device 160 is a liquid crystal display (LCD) device. In this regard, as more fully described below, embodiments of the present disclosure contemplate displaying images on displays having different amounts of display space available for display. While the display device 160 is preferably a color display; the disclosed embodiments will also work with black-and-white displays.

The driver rewards 150 illustrated in FIG. 1 refers to a computer program stored in the memory 140 that implements the herein described driver reward functionality. The features are described in the context of functional program modules that contain computer-executable instructions that are executed by one or more computer processors, illustrated pictorially in FIG. 1 as the display processor 130. As is well known to those familiar with computer programming, generally, program modules include routines, subroutines, programs, data structures, etc., that perform particular tasks.

As will be better understood from the following description, as used herein, the term driver reward (or rewards) refers to a program that creates a display that depicts rewards or penalties based on how an operator, i.e., a truck driver, performs, i.e., operates a truck, vis-à-vis against the level of customer-specified metrics. Preferably, the level of customer-chosen metrics is programmable. That is, the customer-chosen metrics of the drivers reward program are preferably customizable or modifiable by the owner of the vehicle or a person or device who has appropriate access to the driver rewards program 150 stored in the memory 130 of the computing system 100. Preferably, the drivers reward program 150 is configured to require that a password be entered before permitting reprogramming or modification.

Figure 2:
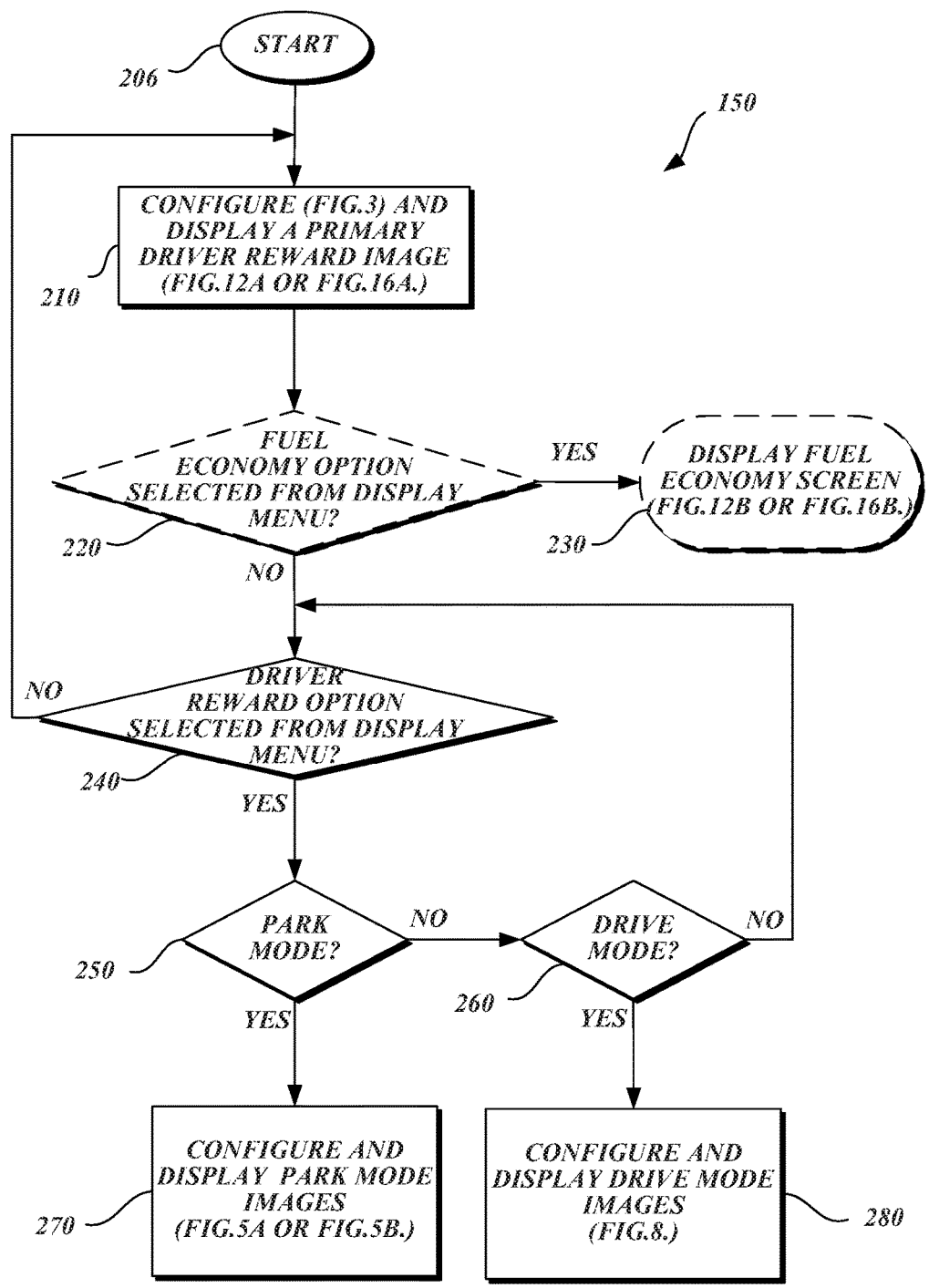
FIG. 2 is a flow diagram of an exemplary process or program for carrying out the embodiments disclosed herein.

FIG. 2 illustrates a driver rewards program 150. The driver rewards program 150 is stored in a suitable computing device memory, such as the memory 140 of the computing system 100 illustrated in FIG. 1. The driver rewards program can be carried out by any suitable hardware, software, firmware, or combination thereof such as the elements generally illustrated in FIG. 1 and described above. The order in which the operations are illustrated in FIG. 2 and the subroutines incorporated therein and described below are not to be construed as limiting since the various steps can be carried out in other ways.

At block 206, the driver rewards program 150 is initiated. The driver rewards program 150 is initiated when a vehicle is running and/or other conditions have been met, such as activating the start switch of a vehicle. Normally, a threshold level of data may be required before the program 150 begins to display any reward or penalty information. For example, a threshold level of engine run time or truck travel distance may be required before the program begins to create displayable data. The driver rewards program 150 requires one or more vehicle performance-related inputs in order to perform its functions. In an exemplary embodiment, the program requires one or more of the following inputs: % idle time, freight fuel consumption, and fuel economy. Input data is initially received from an electronic (data) collection unit (ECU) 110 and stored in the memory 140. Alternatively, data collected by the ECU may be stored in the ECU. The actual value of an input is normally the average value of the input over a prescribed period of time or distance, as appropriate. For example, % idle time is the amount of time a truck is allowed to idle during a prescribed time period. Freight fuel consumption and fuel economy are typically based on a prescribed distance. Preferably, the prescribed distance and time period are programmable.

If desired, additional inputs may be added or employed. For example, freight fuel consumption is a metric utilized in some government regulations. Other inputs corresponding to other metrics used in government or organizational regulations may be added. Alternatively, inputs may be disabled. For example, if the vehicle, i.e., the truck, is used in areas where freight fuel consumption is not considered to be important, the freight fuel consumption input may be disabled. Also, if the vehicle is primarily operated on freeways or otherwise makes infrequent stops, it may be desirable to disable the % idle time input. Preferably, a company establishes expected penalty and bonus levels that are associated with each enabled input. The penalty and bonus levels establish a bonus or penalty for each input. The expected, bonus, and penalty levels may be modified or reprogrammed.

Figure 12A:
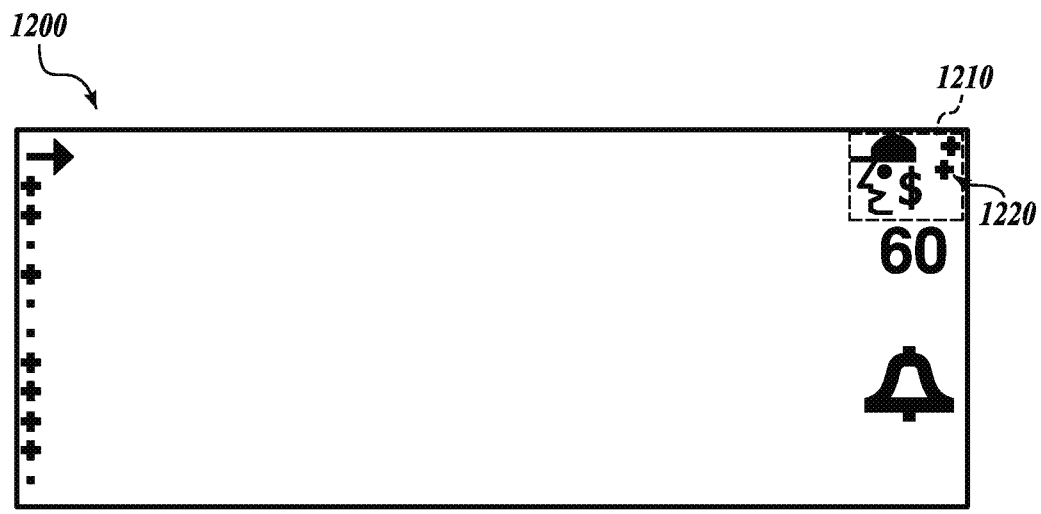
FIG. 12A is a screen shot of an exemplary home screen displaying a primary driver reward image generated by the configure and display a primary driver reward image flow diagram illustrated in FIG. 3.
Figure 16A:
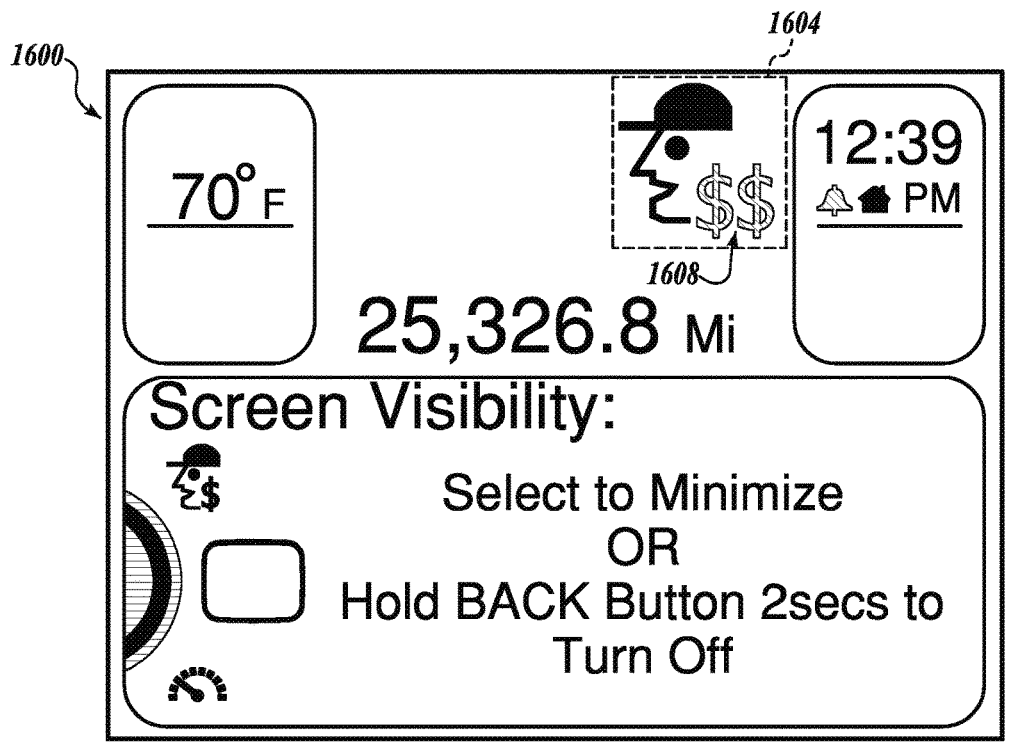
FIG. 16A is a screen shot of an exemplary home screen and a primary driver reward image indicating a full bonus that might be generated by the exemplary process illustrated in FIG. 2.

At block 210, an exemplary subroutine 300 shown in FIG. 3 and described below is called to configure and display a primary driver reward image. The primary driver reward image is displayed on a home or default-type screen, an example of which is shown in FIGS. 12A and 16A also described below. Specific exemplary embodiments of the primary driver reward image are described in detail below.

At block 220, a test or check is made to determine if an option other than a driver reward option has been chosen from a display option menu page. The specific example that is illustrated is a fuel economy option. In this regard, display options other than the driver reward option may be chosen from a display option menu page. The fuel economy option is simply a single example of such options, others not being shown for brevity and because they are unrelated to the disclosed subject matter other than as described with respect to the fuel and economy option. More specifically, the primary driver reward image (block 210) is displayed on all displays when a menu option other than a driver reward option is available. While the selection of different display options causes the overall image displayed by the display device 160 to change, the primary driver reward image remains the same regardless of the chosen display option.

At block 240, if the driver reward option is the selected menu option, a test or check is made to determine the operational state of the vehicle. The normal operational states of a truck that are of interest to this disclosure are the park and drive states. The park or drive state or mode of operation of the vehicle may be determined by the ECU 110 or any other conventional device, such as a microswitch setting determined by the position of a "shift" lever. In some vehicles, the park state may be established when the vehicle's transmission is in park or when the vehicle is not moving and a brake is engaged. Similarly, the drive state may be established when the vehicle's transmission is engaged in a forward moving gear or the vehicle is in motion. The distinction between park and drive states or modes controls which different images are presented to the driver and the options available to the driver. A driver may safely review more complex driver reward information when the vehicle is in park than when in drive. When the vehicle is in motion or the transmission is engaged, for safety reasons, it is preferable that a driver's distraction be minimized.

If at block 240 the test determines that the driver reward option has been selected, at block 250, park mode test or check is made. If at block 240 the test determines that the driver reward option has not been selected, the program 150 cycles back to the beginning of the driver rewards program.

Figure 8:
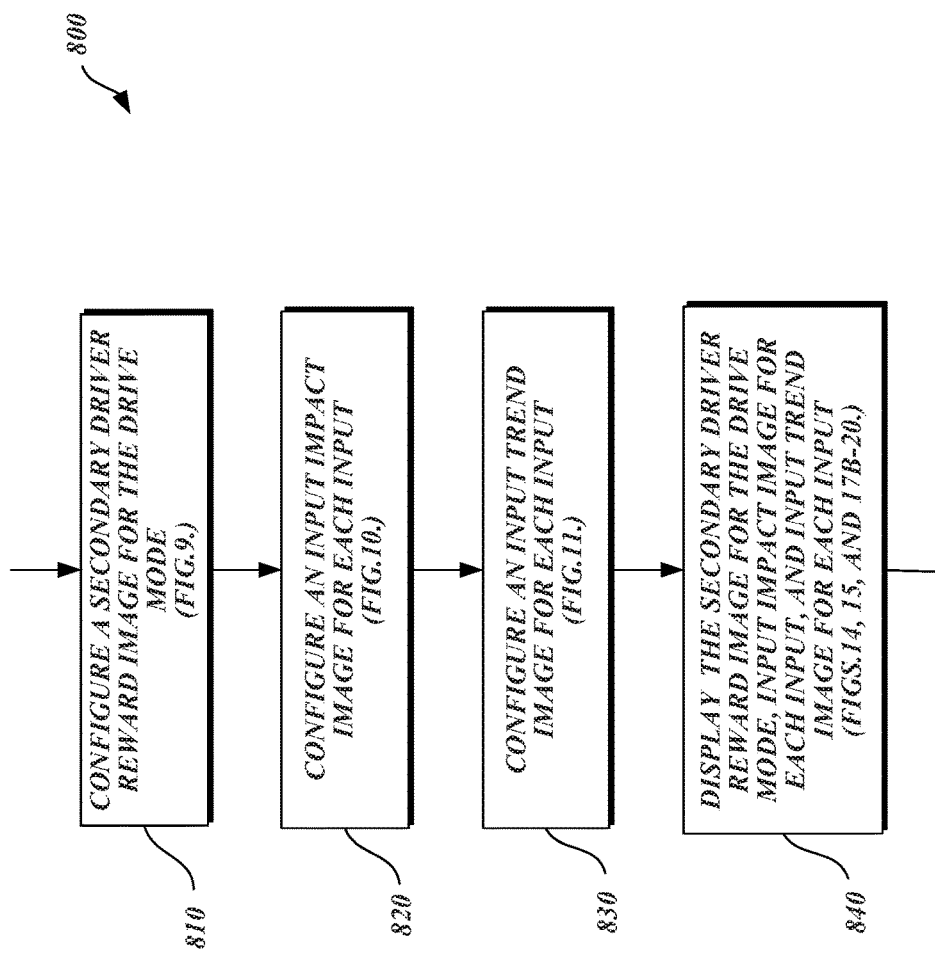
FIG. 8 is a flow diagram of an exemplary drive mode subroutine suitable for use in FIG. 2.

If at block 250 the vehicle is in the park mode, one of two exemplary subroutines 270 shown in FIGS. 5A and 5B are called to configure and display park mode images. If at block 250 the vehicle is determined to be in the park mode, at block 260, a test is made to determine if the vehicle is in the drive state or mode. If at block 260 the vehicle is determined to be in the drive mode, an exemplary subroutine 280 shown in FIG. 8 is called to configure and display drive mode images. If the vehicle is determined at block 260 to not be in the drive mode, the driver rewards program 150 returns to the driver reward option test (block 240).

Figure 3:
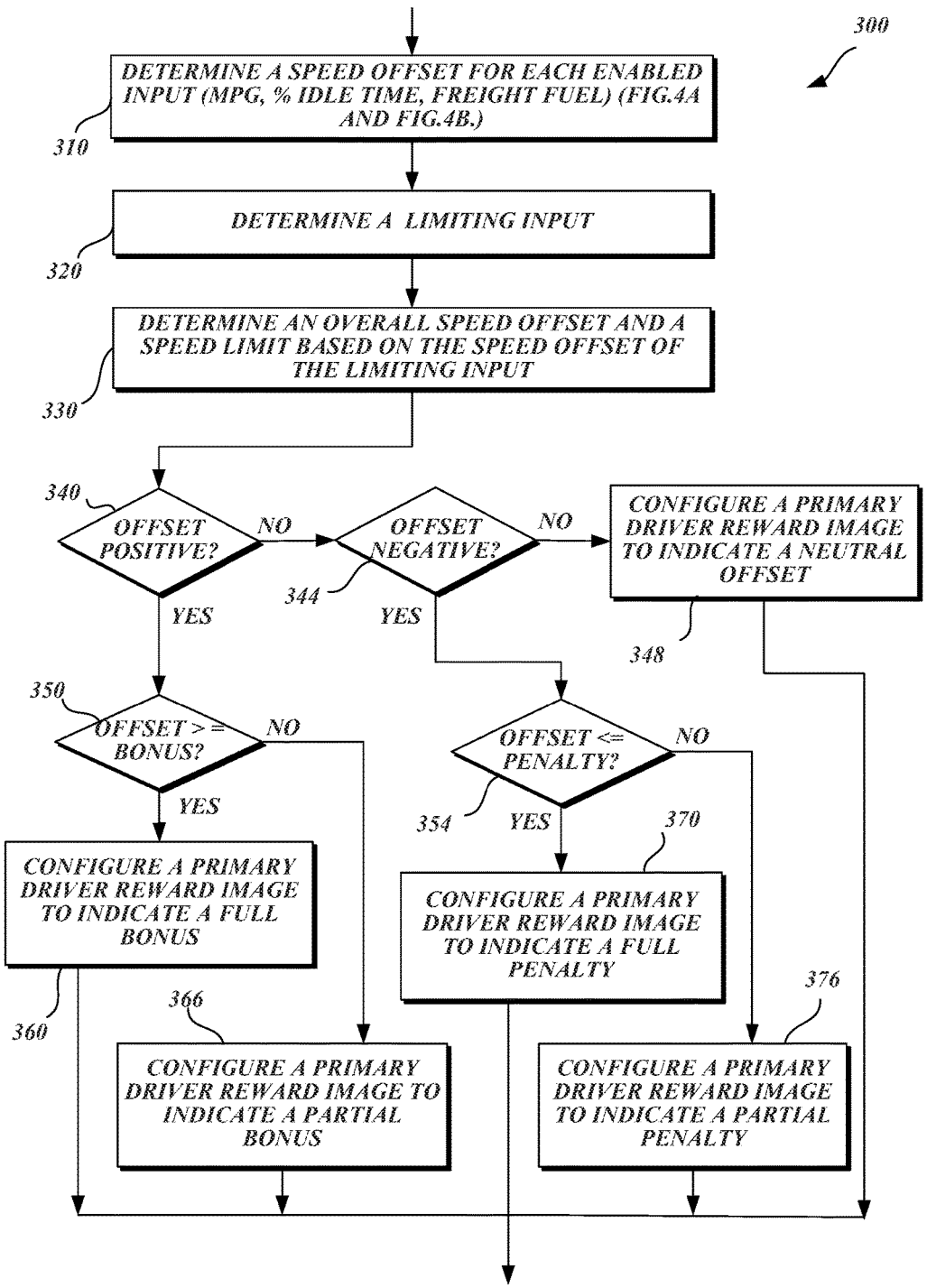
FIG. 3 is a flow diagram of an exemplary driver reward subroutine suitable for use in FIG. 2.

FIG. 3 illustrates an exemplary driver reward subroutine 300 suitable for use in the driver reward program 150 illustrated in FIG. 2. At block 310, a speed offset is determined based on the value of each of a plurality of inputs. Input values may be determined by the ECU 110 and sent to the display processor 130, determined by the display processor 130, or retrieved by the display processor 130 from memory 140. In the herein described exemplary embodiments, the available inputs are fuel economy, freight fuel economy, and % idle time. As discussed below in relation to FIGS. 4A and 4B, speed offset may be positive or negative. A positive speed offset may correspond to a bonus and a negative speed offset may correspond to a penalty. Speed offsets may be in units of miles per hour (mph) or kilometers-per-hour (km/h). Exemplary graphs for determining a speed offset corresponding to an input value are illustrated in FIGS. 4A and 4B and described in detail below.

At block 320, the limiting input is determined. In the herein described exemplary embodiments, the limiting input is the input with the lowest speed offset. The limiting speed offset is determined in a least-wins fashion based upon the speed offset of each input. Under a least-wins process, the overall vehicle speed offset is the value of the minimum of the speed offsets that is determined by each input. At block 330, an overall speed offset and a speed limit based on the speed offset of the limiting input is determined. In other words, the overall speed offset is the value of the speed offset of the limiting input. It should be understood by those of ordinary skill in the art that other methods of determining a speed offset are possible, such as a speed offset based on the value of the average speed offset of all of the inputs.

The overall speed offset is combined with a default speed limit to determine an overall speed limit. The default speed limit may be a customizable or reprogrammable parameter that is part of the driver rewards program 150. To illustrate, if the default speed limit is 60 miles per hour (mph) and the overall speed offset is determined to be +5, the overall speed limit would be 65 mph. Similarly, if the default speed limit is 55 and the overall speed offset is determined to be −3 mph, the overall speed limit would be 52 mph.

At block 340 a test is made to determine if the overall speed offset is positive. If the overall speed offset is positive, at block 350, a test is made to determine if the overall speed offset is greater than or equal to the bonus. If the result of this test is positive, at block 360, the primary driver reward image is configured to indicate a full bonus. If the overall speed offset is positive but less than the bonus threshold metric, at block 366, the primary driver reward image is configured to indicate a partial bonus. If the overall speed offset is not positive, at block 344, a test is made to determine if the overall speed offset is negative. Then, at block 354, a test is made to determine if the overall speed offset is less than or equal to a penalty threshold metric. If the result of both tests is positive, at block 370, the primary driver reward image is configured to indicate a full penalty. If the overall speed offset is negative (block 344) but greater than the penalty threshold metric (block 354), at block 376, the primary driver reward image is configured to indicate a partial penalty. If both the offset positive test (block 340) and offset negative test (block 344) are negative, at block 348, the primary driver reward image is configured to indicate a neutral offset, which corresponds to a neutral reward or no penalty, or more specifically, a neutral offset indicates that neither a reward nor a penalty is occurring. A neutral offset is normally indicative of 0 speed offset. If desired, a neutral offset may be generated and displayed if a particular input is disabled.

FIG. 4A is a graph 405 that illustrates an exemplary relationship between fuel economy (in mpg) and vehicle speed offset for actual mpg value. Preferably a default relationship between fuel economy (mpg) and vehicle speed offset is modifiable by the owner of the vehicle reprogramming the relationship. Point 410 of the graph 405 sets a −5 mph penalty set for actual fuel economies of 6 mpg and lower. In effect, this is a 100% or maximum penalty point. Point 420 sets a 0 mph vehicle speed offset value for an actual fuel economy of 6.5 mpg. Accordingly, the 6.5 mpg fuel economy reflects the neutral offset or no bonus/penalty. Point 430 sets a +3 fuel economy bonus value for a fuel economy of greater than or equal to 7.0 mpg. In effect, this is the 100% or maximum bonus point. An offset for each actual fuel economy values in between the maximum penalty, expected, and maximum bonus levels is determined by linear interpolation from expected to maximum bonus and expected to maximum penalty. As an example, point 415 represents an actual fuel economy of 6.4 mpg, which corresponds to a speed offset penalty of −1 mph.

FIG. 4B is a graph 435 that illustrates an exemplary relationship between % idle time and vehicle speed offset for an actual % idle time value. Preferably a default relationship between % idle time and vehicle speed offset is modifiable by the owner of the vehicle reprogramming the relationship. At point 450, the graph sets a −5 mph penalty value for an actual % idle time of 15% and higher. This, in effect, is the 100% or maximum penalty point. Point 460 sets a 0 mph vehicle speed offset value for an actual value of 10% idle time. Thus, a 10% idle time represents the neutral or no bonus/penalty offset. Point 470 sets a +3 mph bonus value for a % idle time of less than or equal to 5.0%. Again, in effect, this is the maximum bonus point. Similar to the fuel economy graph illustrated in FIG. 4A and described above, vehicle speed offset values for % idle values lying between the maximum penalty, expected (neutral), and maximum bonus levels are determined through linear interpolation. As an example, point 440 is shown as associated with a % idle of 14%, which corresponds to an 80% speed offset penalty of −4 mph.

The graphs 405 and 435 illustrate an approach to setting reward and penalty metrics that is focused more on punishment than providing rewards because the maximum reward is a +3 mph offset and the maximum penalty is a −5 mph offset. As noted above, the relationship between expected, maximum bonus, and maximum penalty values for an input are modifiable. Thus, the graphs 405 and 435 shown in FIGS. 4A and 4B should be taken as exemplary, not as limiting. Further, the owner of a vehicle may be more concerned about inputs other than those shown in FIG. 4A (fuel economy) and FIG. 4B (% idle time), depending on the primary use of a particular vehicle. Further, if a vehicle (truck) is primarily operated in cities, % idle time may be more important than fuel economy. In some situations, the results of both may be compared and the larger value (bonus or penalty) chosen and the other ignored. In other situations freight fuel economy may be more important to the owner of the vehicle than fuel economy. In such situations, the owner could specify a +5 mph rewards for meeting the bonus value set for freight fuel consumption and disable the fuel economy input or otherwise prevent it from being considered.

FIG. 5A is a flow diagram of an exemplary park mode subroutine, suitable for use in FIG. 2. The FIG. 5A diagram is intended for use with a large display whereas the exemplary flow diagram shown in FIG. 5B and described below is intended for use with a smaller display.

Figure 17A:
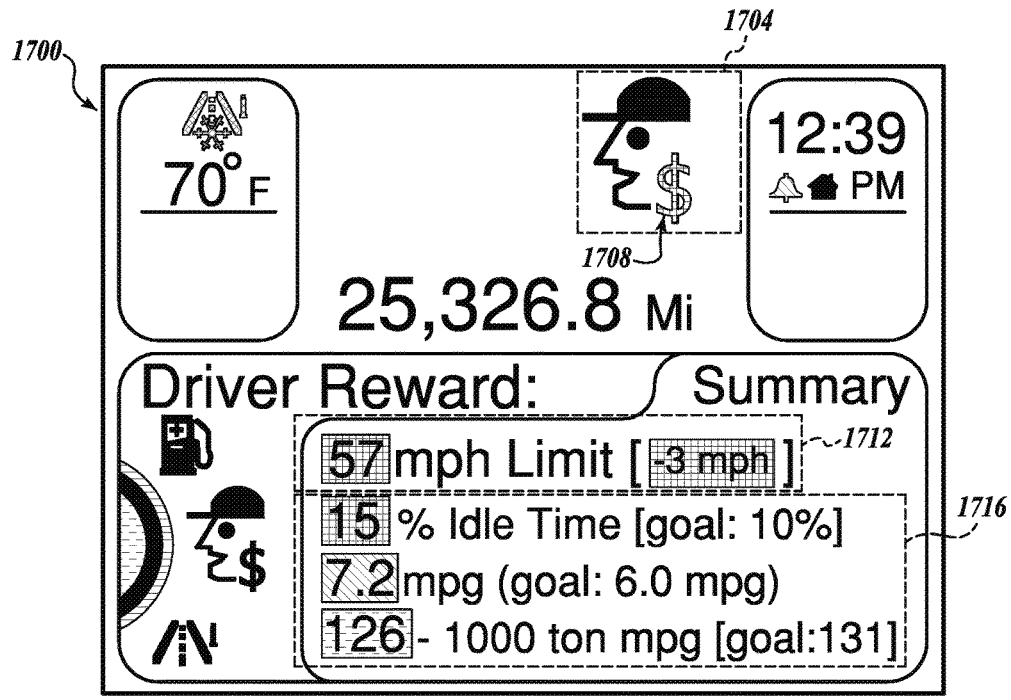
FIG. 17A is a screen shot of an exemplary park mode screen of an exemplary secondary driver reward image for the park mode indicating a partial penalty and three input images that might be generated by the exemplary park mode subroutine illustrated in FIG. 5A.

At block 520, a secondary driver reward image is configured for the park mode. Preferably, the secondary driver reward image for the park mode includes an overall speed offset value and a speed limit value determined in a similar or identical manner to that described above with respect to FIG. 3. If the overall speed offset and a speed limit have already been determined, they may be retrieved from the memory 140. Preferably, the overall speed offset and the speed offset are textual representations of the actual value and expected value. An exemplary secondary driver reward image for the park mode is shown in FIG. 17A.

At block 520, a park mode input image for each input is configured. The park mode input image for an input is configured to include the actual value of the input and an expected value for the input. As discussed above with regard to FIGS. 4A and 4B, the expected value of an input is specified by the owner of the vehicle. The actual value of an input and the expected value of the input may be configured as textual representations of the actual value and the expected value. See, for example, park mode input images 1716 of FIG. 17A described below.

At block 530, the secondary driver reward image for the park mode is configured. In addition, each park mode input image is configured to indicate the state of the input relative to the expected value for the input. Exemplary configurations and formats are herein described in connection with FIG. 17A. An exemplary subroutine suitable for carrying out the functions of block 530 is illustrated in FIG. 6 and described next.

At block 605, a test or check is made to determine if the input is disabled. If the test is positive at block 605, a park mode input image is configured to indicate that the input is disabled. If the input is not disabled, the subroutine 530 proceeds to block 615. At block 615, if the actual value of the input is below an expected value, at block 620, the subroutine configures the park mode input image to indicate that the input is below the expected level. If at block 615 the actual value of the input is not below the expected value, the subroutine 530 proceeds to block 625. At block 625, a test is made to determine if the input is above the expected value. If the actual value of the input is above the expected value, the subroutine 530 proceeds to block 630 where the subroutine configures the park mode input image to indicate that actual value of the input is above the expected value. If the actual value of the input is not above the expected value, the subroutine proceeds to block 635 where the park mode input image is configured to indicate that the input is at the expected level.

From blocks 610, 620, 630, and 635, the subroutine 530 proceeds to block 640. At block 640, a test is made to determine if the speed offset value is positive. If the speed offset is positive, the subroutine 530 proceeds to block 650 where the secondary driver reward image for the park mode is configured to indicate a positive speed offset. If the overall speed offset is not positive (block 640), the subroutine 530 proceeds to block 645 where a test is made to determine if the speed offset value is negative. If the speed offset value is negative, the subroutine proceeds to block 655. At block 655, the secondary driver reward image for the park mode is configured to indicate a negative speed offset. If at block 645, the speed offset is not negative, the subroutine 530 proceeds to block 660 where the secondary driver reward image for the park mode is configured to indicate a neutral speed offset. After the subroutine 530 shown in FIG. 6 has completed, the process returns to FIG. 5A. At block 540, the system 100 displays the secondary driver reward image for the park mode and park mode input images as configured in blocks 510, 520, and 530.

Figure 6:
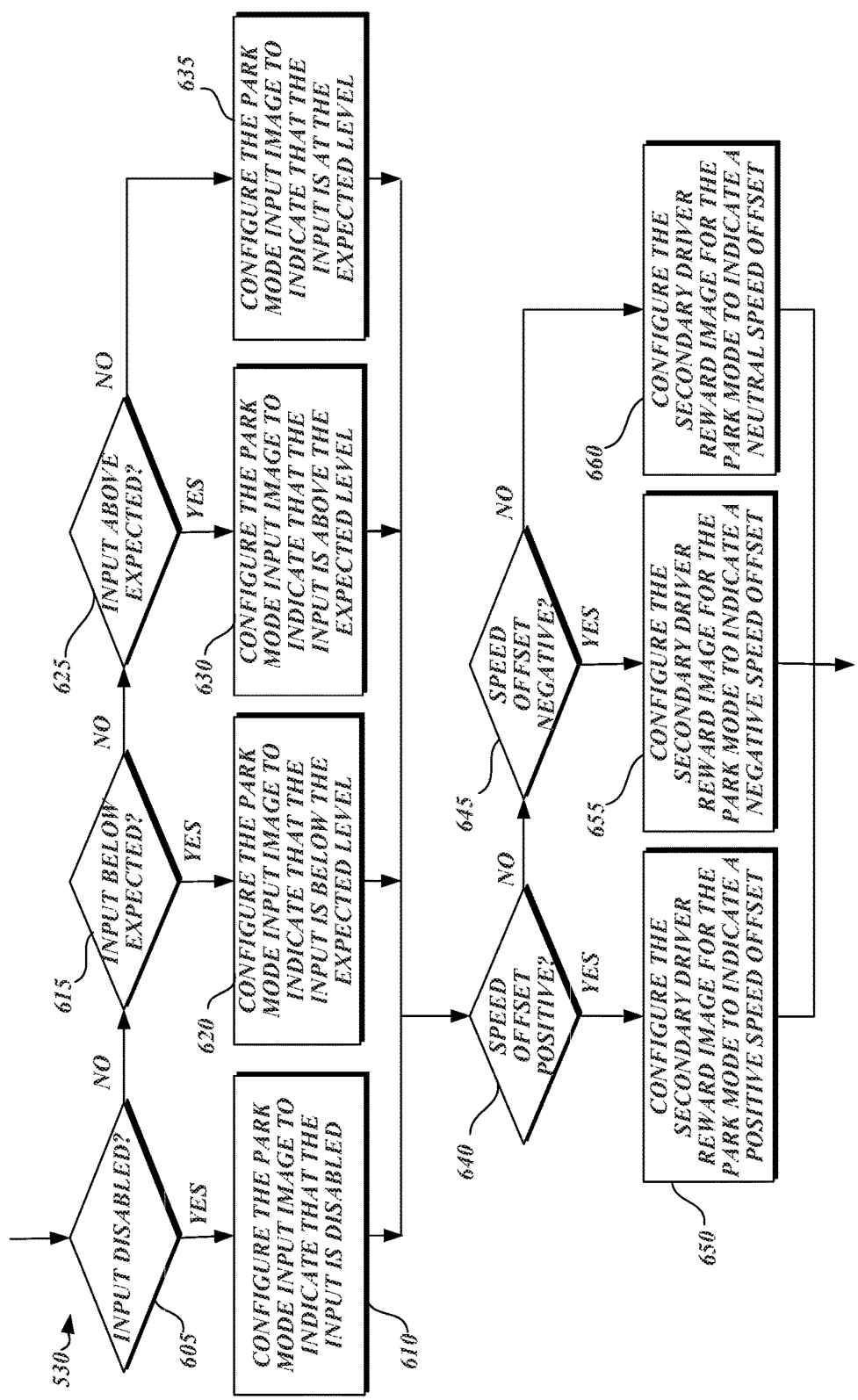
FIG. 6 is a flow diagram of an exemplary configured park mode input image and secondary driver reward image subroutine suitable for use in FIG. 5A.

Regarding FIG. 6, preferably the format of the secondary driver reward image is based on whether the overall speed offset value is positive, negative, or expected. If the actual value of an input is below the expected value for an input, which means that the overall speed offset value is negative, the image is configured in a first format. If the actual value of the input is above the expected value, which means that the overall speed offset value is negative, the input image is configured in a second format that is different than the first format. If the actual value of an input is at the expected value, which means that the overall speed offset value is neutral or zero, the image is formatted in a third format that is different than the first format and the second format. As noted above, after the subroutine 600 shown in FIG. 6 is finished, the program returns to FIG. 5A. At block 540, the secondary driver reward image for the park mode and park mode input images as configured in blocks 510, 520, and 530 are displayed as described below in conjunction with FIG. 17A.

Figure 7:
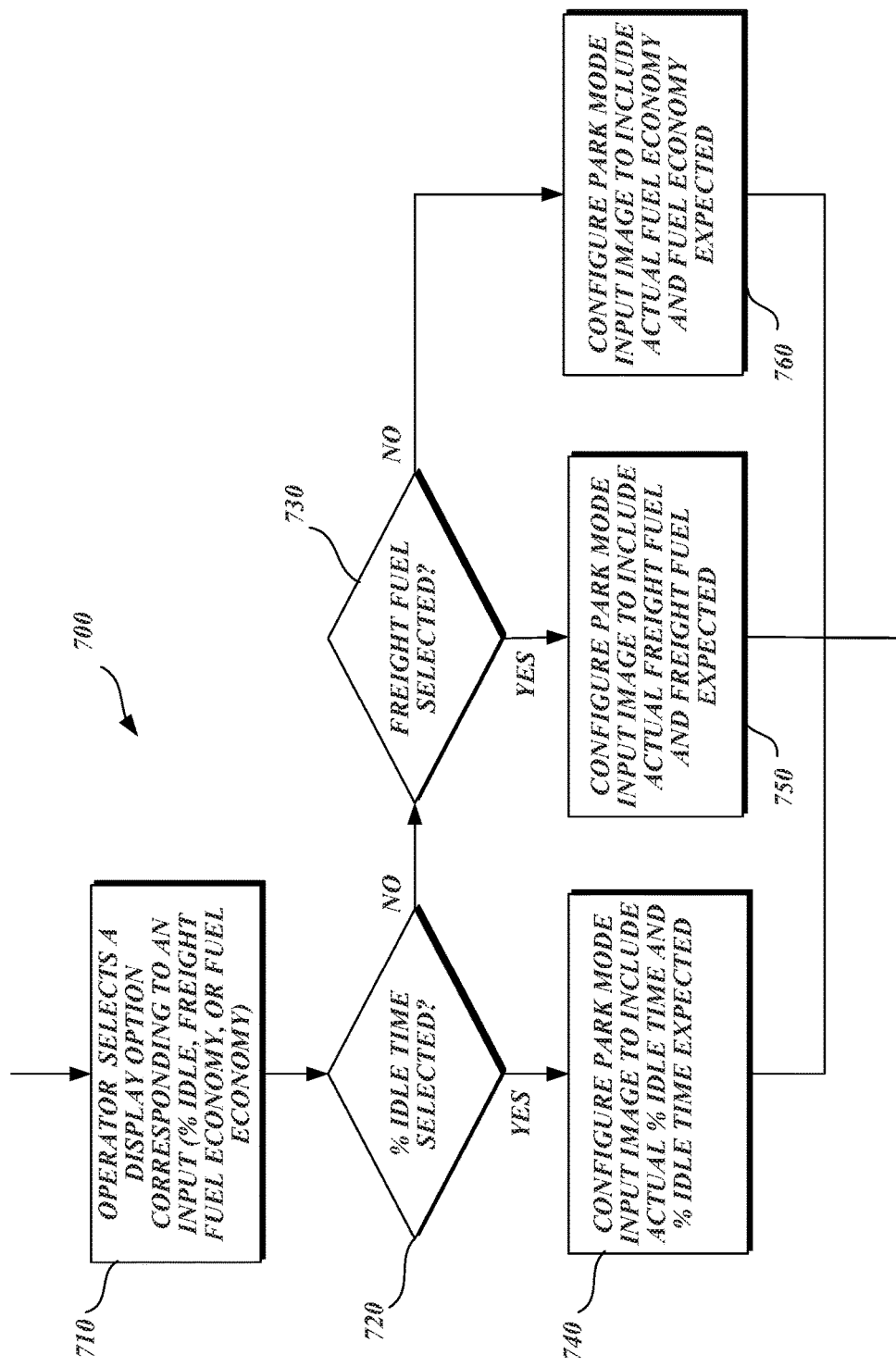
FIG. 7 is a flow diagram of an exemplary configured park mode input image subroutine suitable for use in FIG. 5B.

FIG. 5B is a flow diagram of an alternate exemplary park mode subroutine 555. As stated above, the FIG. 5B subroutine 555 is intended for use with a display that has less display space available than the space of the display with which the FIG. 5A subroutine 505 is intended to be used. At block 550, a park mode input image is configured. An exemplary subroutine 700 suitable for use in configuring the park mode input image is shown in FIG. 7 and described next.

As noted above, subroutine 700 is designed for a small type display, i.e., a display with a small amount of space available for images. This subroutine is also useful if it is desirable to display information about only a single input. Subroutine 550 also may be preferable for use with low-resolution displays that are not capable of displaying an image in color. At block 710, the truck operator selects an input to be displayed using the user interface 120. In the illustrated embodiment, the available selections are % idle time, freight fuel economy, and fuel economy. Alternatively, in other embodiments, different inputs may be used.

Figure 13A:
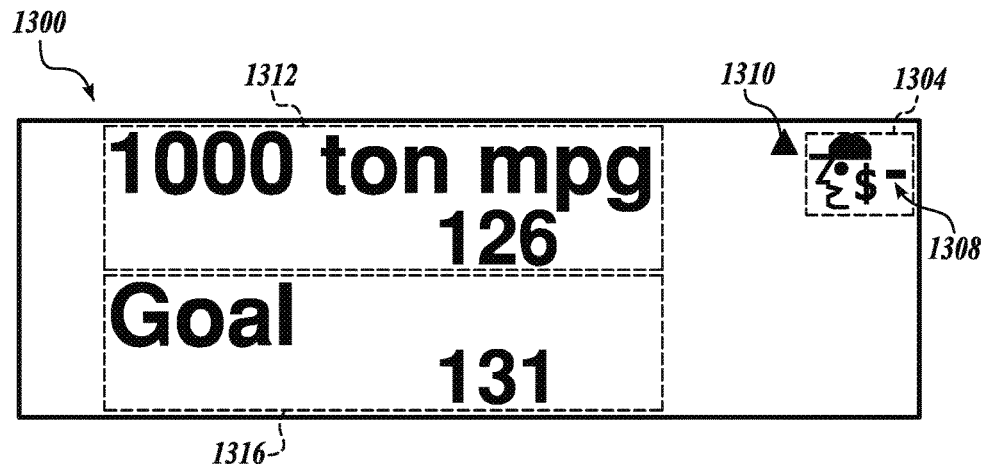
FIG. 13A is a screen shot of an exemplary freight fuel input image that might be generated by the park mode image subroutine illustrated in FIG. 7.
Figure 13B:
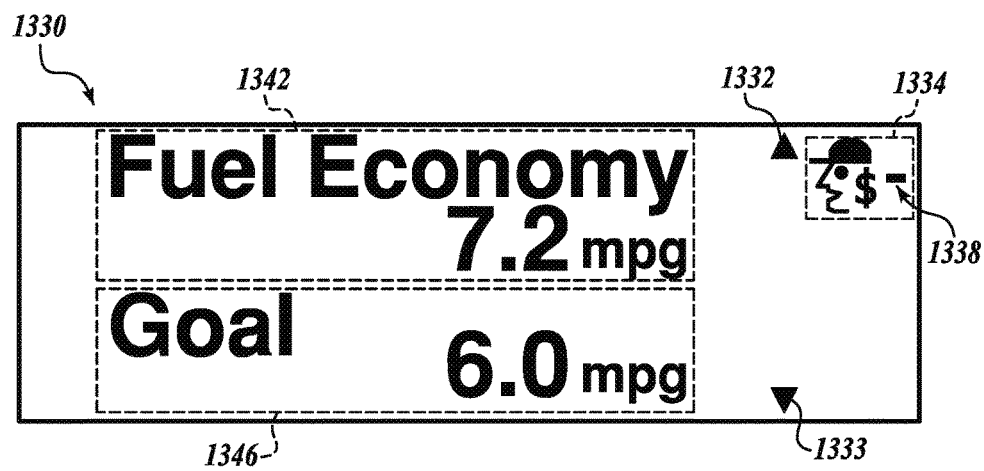
FIG. 13B is a screen shot of an exemplary fuel economy input image that might be generated by the park mode image subroutine illustrated in FIG. 7.
Figure 13C:
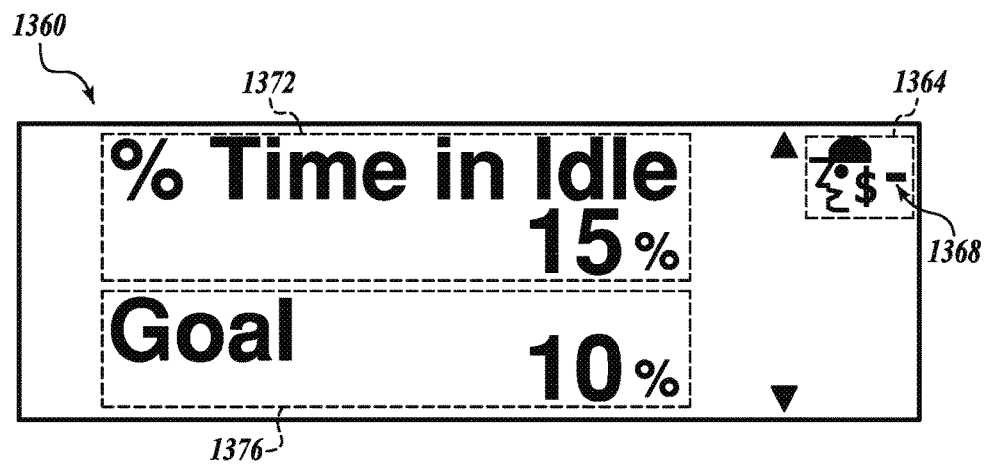
FIG. 13C is a screen shot of an exemplary % idle time input image that might be generated by the park mode image subroutine illustrated in FIG. 7.

At block 720, the subroutine 700 determines if % idle time has been selected. If % idle time has been selected, the subroutine proceeds to block 740. At block 740, the park mode input image is configured to include the actual % idle time value and the expected % idle time value. If % idle time has not been selected (block 720), a test is made to determine if freight fuel economy has been selected (block 730). If freight fuel economy has been selected (block 730), the subroutine proceeds to block 750 where the park mode input image is configured to include the actual freight fuel value and the freight expected value. If neither % idle time (block 720) nor freight fuel economy (block 730) have been selected, presumably fuel economy has been selected and the subroutine proceeds to block 760. At block 760, the park mode input image is configured to include the actual fuel value and the expected fuel value. Preferably, the actual value of the input and the expected value of the input images are textual representations of the actual value and expected value. After subroutine 700 is finished, the process returns to FIG. 5B, where the configured park mode input image is displayed (block 560). Exemplary images are shown in FIGS. 13A-13C and described below.

Figure 9:
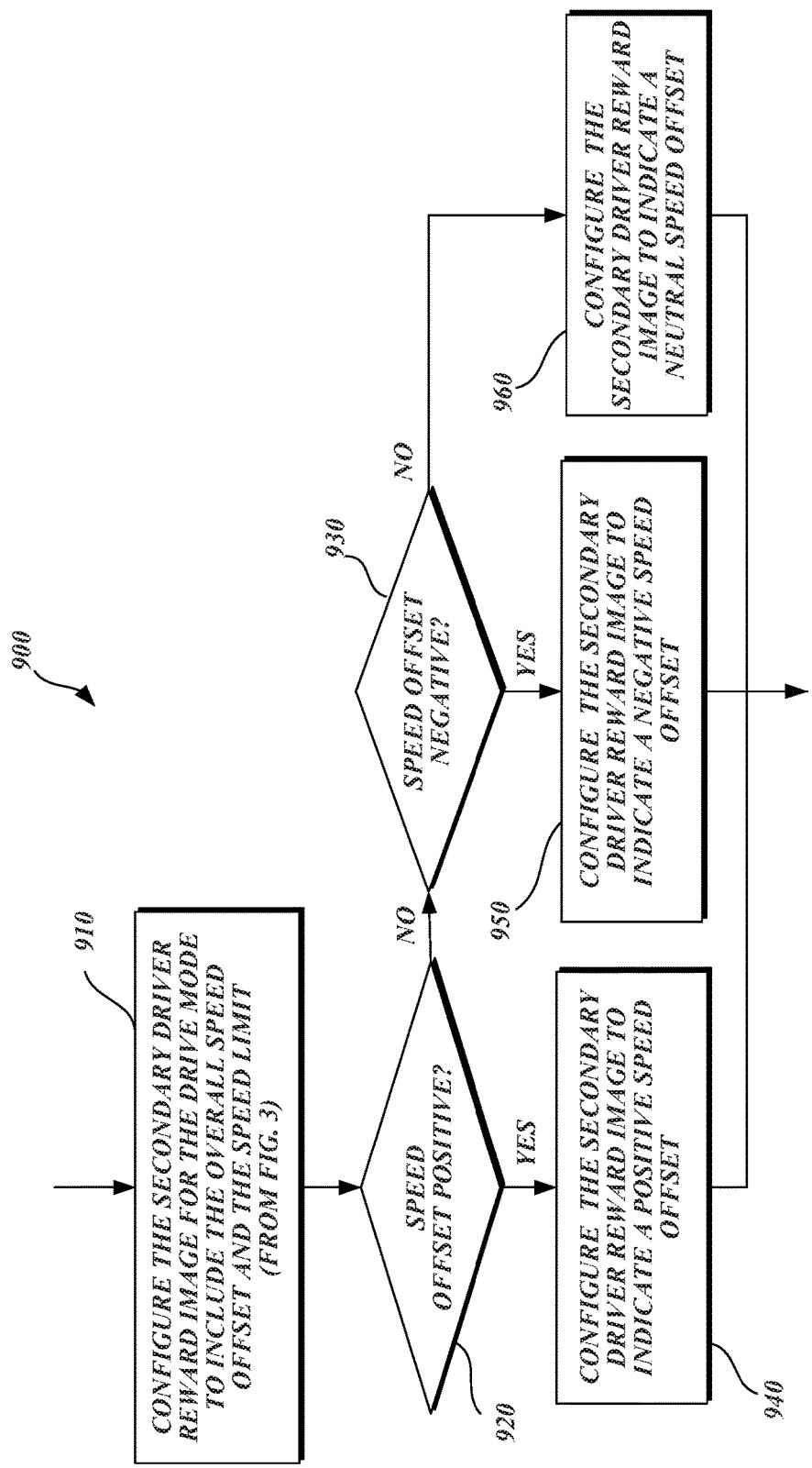
FIG. 9 is a flow diagram of an exemplary configured secondary driver reward image subroutine suitable for use in FIG. 8.

Returning to FIG. 2, if the vehicle is in the drive mode, a drive mode subroutine 800, an example of which is shown in FIG. 8, is executed. At block 810 the system configures a secondary driver reward image for the drive mode. This is accomplished by executing the exemplary subroutine 900 shown in FIG. 9 and described next.

At block 910 the secondary driver reward image for the drive mode is configured to include the overall speed offset and the speed limit values. These values may be retrieved from the memory 140 or may be determined by executing a subroutine of the type illustrated in FIG. 3 and described above. At block 920, if the speed offset is positive, the subroutine 900 cycles to block 940 where the secondary driver reward image for the drive mode is configured to indicate a positive speed offset. Alternatively, if the speed offset is negative, at block 930, the subroutine 900 cycles to block 950 where the secondary driver reward image for the park mode is configured to indicate a negative speed offset. If the overall speed offset is neither positive nor negative, the subroutine 900 cycles to block 960 where the secondary driver reward image for the drive mode is configured to indicate a neutral or zero speed offset. Exemplary secondary driver reward images for the foregoing drive mode configurations are illustrated in FIGS. 17-20 and described below.

Figure 10:
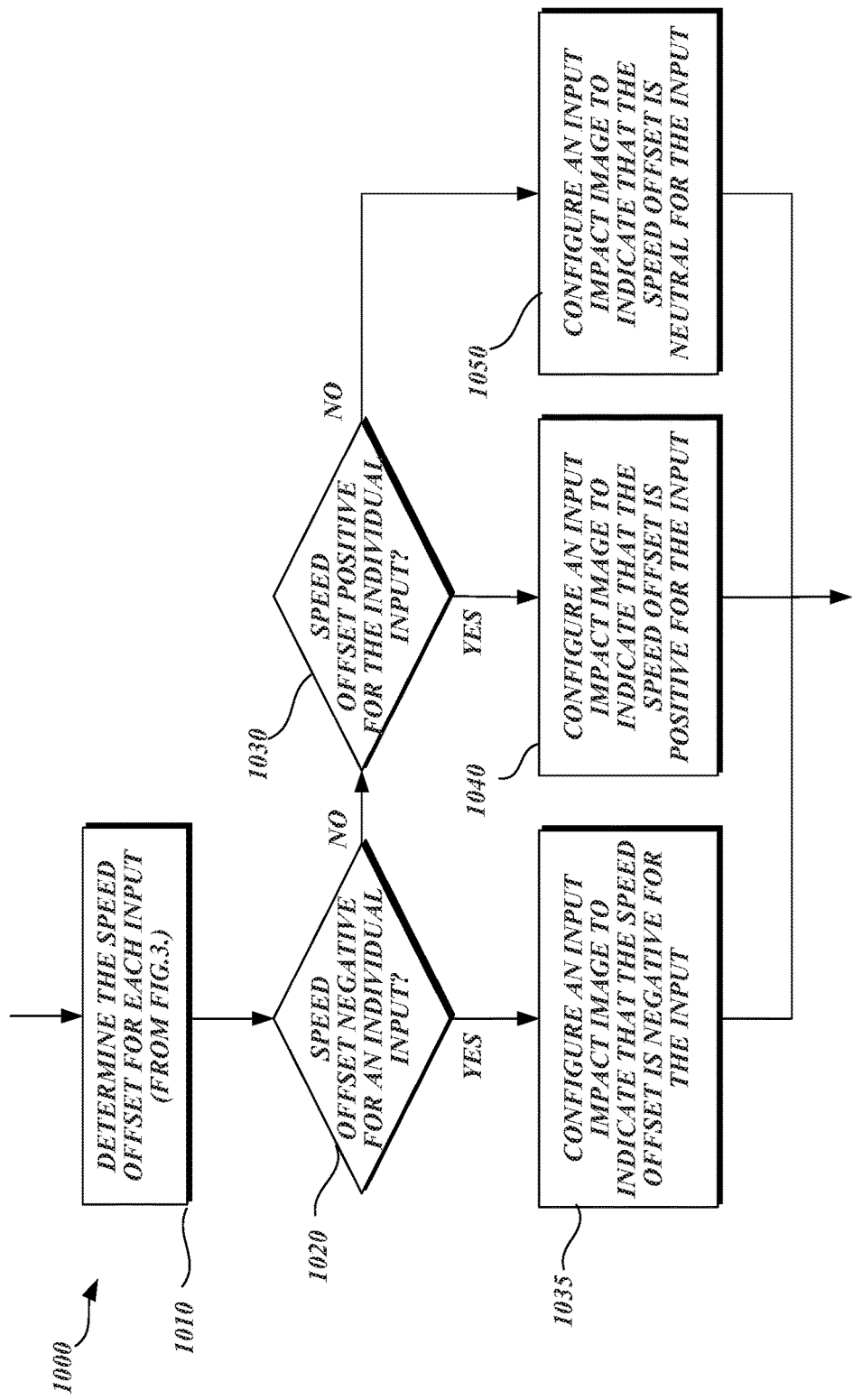
FIG. 10 is a flow diagram of an exemplary configured input impact image subroutine suitable for use in FIG. 8.

Returning to FIG. 8, at block 820, the driver rewards program 150 configures an input impact image for each input. An exemplary subroutine 1000 suitable for configuring the input impact image is illustrated in FIG. 10 and described next.

At block 1010, the speed offset value for each input is determined or retrieved from the memory 140. If, at block 1020, the speed offset is determined to be negative for an individual input, at block 1035, an impact image for the input is configured to indicate that the speed offset is negative. If the speed offset is not negative (block 1020), the subroutine 1000 proceeds to block 1030 when a test is made to determine if the speed offset value for the individual input is positive. If the speed offset value is positive for the individual input, the impact image is configured to indicate that the speed offset value is positive (block 1040). If the speed offset value is neither negative (block 1020) nor positive (block 1030) at block 1050, the input impact image is configured to indicate that the speed offset value is neutral for the individual input. In some embodiments, a neutral type impact image may be used if the actual value for the input is at the expected value for the input or the input is disabled or is excluded from the determination of the overall speed offset. After the subroutine 1000 is executed for each input, the process returns to FIG. 8.

At block 830 (FIG. 8), the subroutine determines and creates, i.e., configures, a trend image for each input. The trend refers to an indication of whether vehicle performance inputs are improving or worsening based on driver performance.

Figure 11:
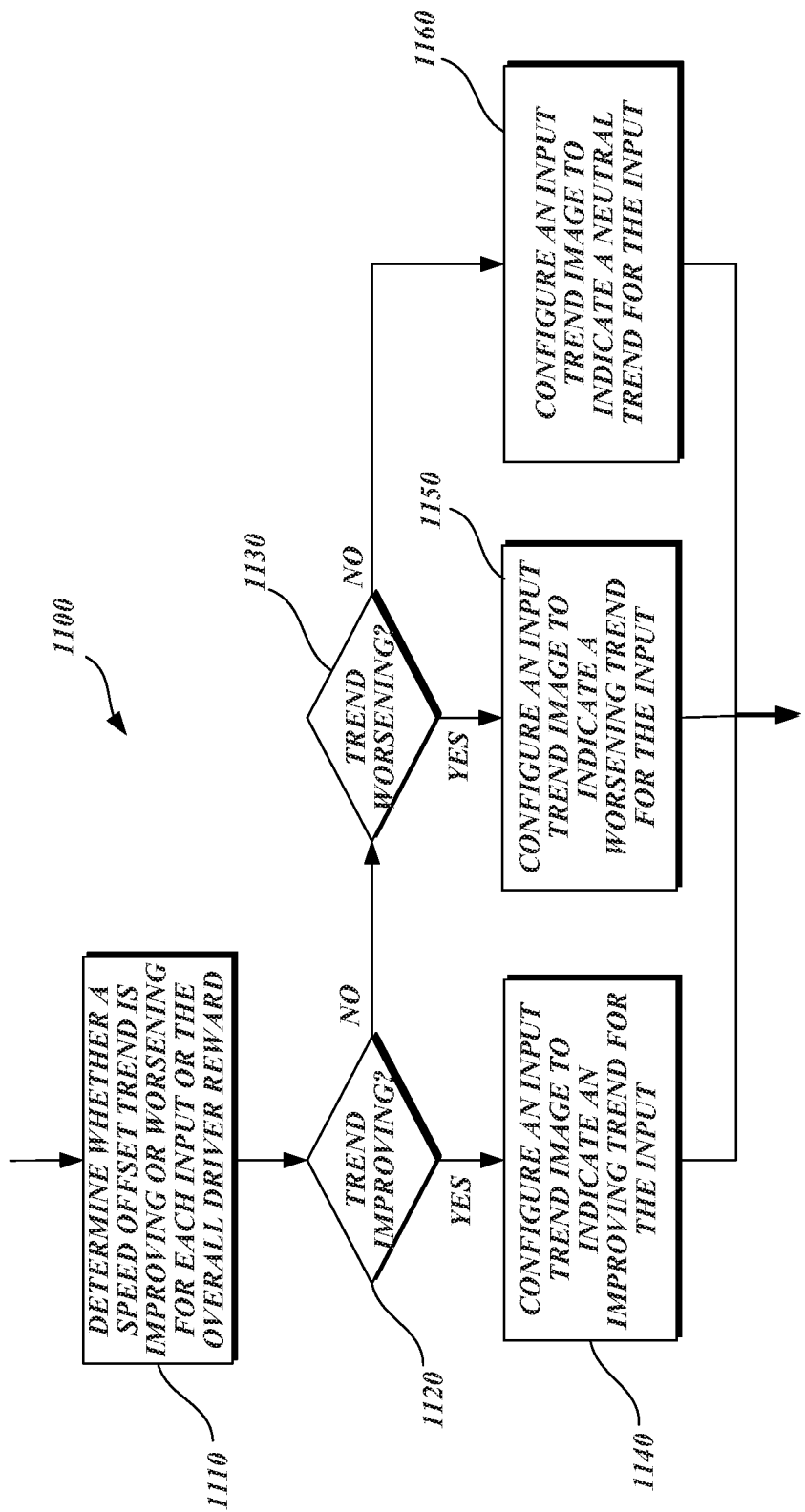
FIG. 11 is a flow diagram of an exemplary configured input trend image subroutine suitable for use in FIG. 8.

FIG. 11 illustrates an exemplary subroutine 1100 for creating a trend image for each input. At block 1110, whether the speed offset trend is improving or worsening is determined. The speed offset trend may be based on the overall driver reward or the speed offset associated with each individual input. Regardless, at block 1120, a test is made to determine if the trend is improving. If the trend is improving at block 1140, an input trend image is configured to indicate an improving trend. If the trend is not improving, at block 1130, a test is made to determine if the trend is worsening. If the trend is worsening, at block 1150, the input trend image is configured to indicate a worsening trend. If the trend is not improving (block 1120) or worsening (block 1130), the input trend image is configured to indicate a neutral or no-change trend for the input. Subroutine 1100 is repeated for each enabled input or by each input used to determine an overall driver reward. In some embodiments where the speed offset trend is based on the overall driver reward, all the input images would be configured the same.

Returning to FIG. 8, after the trend image subroutine 1100 is completed, the various images created in blocks 810, 820, and 830 are displayed.

FIGS. 12-15 are a variety of screen shots corresponding to different menu option selections and images that may be configured by the driver rewards program 150 (FIG. 2) and related subroutines disclosed herein. The screenshots shown in FIGS. 12-15, allow a driver to quickly determine his or her driver reward score. The screenshots shown in FIGS. 12-15 use a set of driver reward status indicators for the primary driver reward image as follows: ++=full bonus; +=partial bonus; −− full penalty; −=partial penalty; and ' ' (blank)=neutral driver reward status or a driver reward level that is at the expected level. Those of ordinary skill in the art will understand that other types of indicators may be used to indicate penalty/reward status. Thus, the FIGS. 12-15 images (and the FIGS. 16-20 images described below) should be construed as exemplary, not as limiting.

As noted above, FIGS. 12-15 depict images configured according to the FIG. 2 driver rewards program 150 and related subroutines. FIGS. 14-15 include input trend images for the three exemplary chosen inputs described herein: % idle, mpg, and freight fuel. The input trend images use an upward pointing arrow for an improving trend, a downward pointing arrow for a worsening trend, and a no arrow for a neutral trend. Again, those of ordinary skill in the art will understand that other types of trend indicators may be used and, thus, the illustrated one should be construed as exemplary and not as limiting.

FIG. 12A is a screen shot of a home screen 1200 showing an exemplary primary driver reward image 1210. The primary driver reward image 1210 takes a relatively small amount of the overall space of the home screen 1200. The primary driver reward image 1210 includes a side profile of a human face, $ sign, and '+' symbol. The primary driver reward image 1210 may include a driver reward status indicator 1220. The driver reward status indicator 1220 includes two '+'s, which indicate a full bonus driver reward state. If another display option is selected, the displayed layout may change, but, preferably, the primary driver reward image 1210 remains. That is, preferably, the primary driver reward image that is displayed (FIG. 2, block 230) regardless of the "page" actually being displayed in the display device 160 (FIG. 1).

Figure 12B:
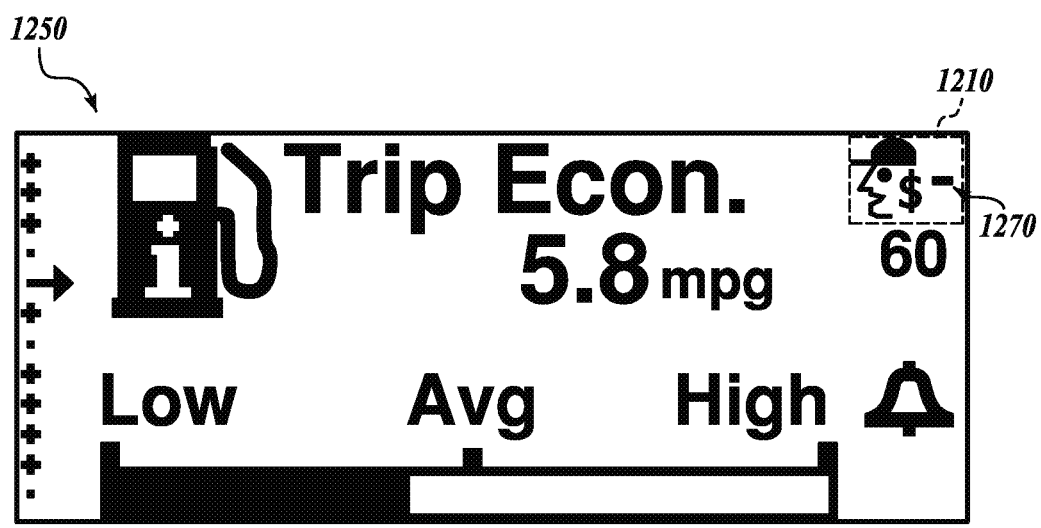
FIG. 12B is a screen shot of an exemplary fuel economy screen display resulting from the fuel economy screen selection illustrated in FIG. 2.

FIG. 12B is a screen shot of a trip economy screen 1250 that includes the exemplary primary driver reward image 1210. In this screen shot, the primary driver reward status indicator 1270 includes one '−' which indicates a partial penalty driver reward state. The trip economy screen 1250 provides additional information about the trip. The fuel economy information provided in the trip economy screen 1250 may be the same or different from fuel economy input used to calculate the driver reward.

FIG. 12C is a screen shot of a trip economy screen 1250 showing an exemplary primary driver reward image 1260. The primary driver reward image includes a driver reward status indicator 1270. The primary driver reward status indicator 1270 includes one '−' which indicates a partial penalty driver reward state. The trip economy screen provides additional information about the trip. The fuel economy information provided in the trip economy screen may be the same or different from fuel economy input used by the system 100 to calculate the driver reward.

FIGS. 13A-13C are different screen-shot images for the park mode (i.e., when the truck transmission is in a park position, as described above). In particular, FIG. 13A is a screen shot of a driver reward screen 1300 for the park mode when the freight fuel economy menu option is selected. The driver reward screen 1300 for the park mode includes a park mode input image that includes two images. One image 1312 is a textual representation of the actual freight fuel economy and the other image 1316 is an image of the expected freight fuel economy. Screen shot 1300 also includes a primary driver reward image 1304 that includes a driver reward status indicator 1308 that indicates a partial penalty. A display option image 310 signifies that other driver reward screens are available. The specific location of the display option image 1310 on the display and the direction of arrow of the display option image 1310 may signify an input needed to change to another display option.

FIG. 13B is a screen shot of an exemplary driver reward screen 1330 for the park mode when the fuel economy menu option is selected. The driver reward screen 1330 for the park mode includes two park mode input images. One image 1342 is a textual representation of the actual fuel economy and the other image 1346 is a textual representation of the expected fuel economy. Screen shot 1330 also includes a primary driver reward image 1334 that includes a driver reward status indicator 1338 that indicates a partial penalty. Two display option images 1332 and 1332 signify that additional driver reward displays are available, such as FIGS. 13A and 13C.

FIG. 13C is a screen shot of an exemplary driver reward screen 1360 for the park mode when the % idle menu option is selected. The driver reward screen 1360 for the park mode includes a park mode input image that includes two images. One image 1372 is a textual representation of the actual fuel economy and the other image 1376 is a textual image of the expected freight fuel economy. Screen shot 1360 also includes a primary driver reward image 1364 that includes a driver reward status indicator 1368. The driver reward status indicator 1368 indicates a partial penalty.

Figure 14A:
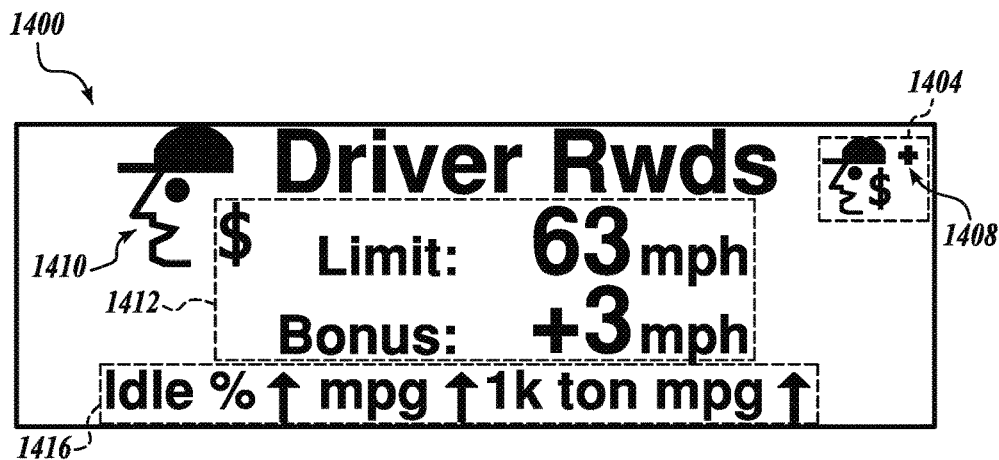
FIG. 14A is a screen shot of an exemplary secondary driver reward image indicating a partial bonus that might be generated by the exemplary drive mode subroutine illustrated in FIG. 8.

FIG. 14A is a screen shot 1400 of an exemplary driver reward screen for the drive mode, i.e., when the truck transmission is in the drive position. The screen shot 1400 includes a secondary driver reward image 1412 for the drive mode that includes textual representations of the overall speed offset and the speed limit. The secondary driver reward image 1412 includes the word "Bonus:" before the overall speed offset of "+3 mph" to indicate the bonus status. Screen shot 1400 also includes a primary driver reward image 1404 with a driver reward status indicator 1408 that indicates a partial reward. Screen shot 1400 also includes an input trend image 1416 that indicates an improving trend for all inputs.

Figure 14B:
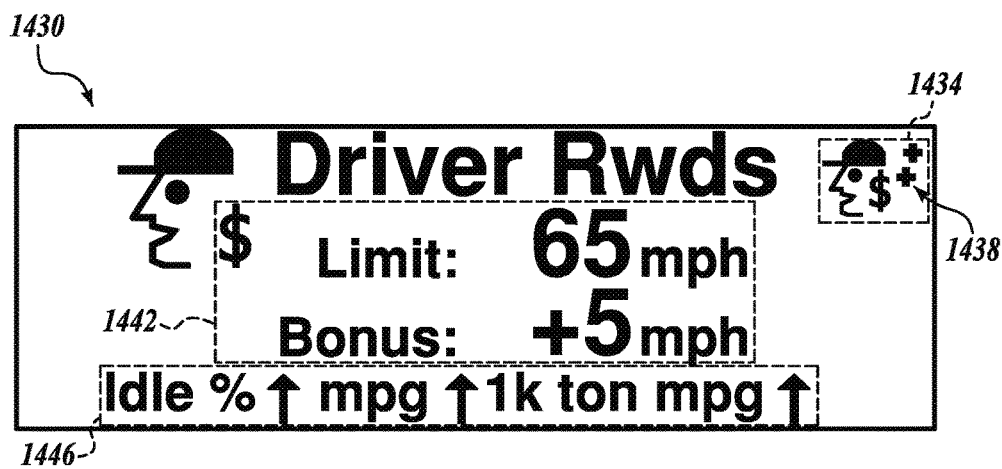
FIG. 14B is a screen shot of an exemplary secondary driver reward image indicating a full bonus that might be generated by the exemplary drive mode subroutine illustrated in FIG. 8.

FIG. 14B is a screen shot 1430 of another exemplary driver reward screen for the drive mode. The screen shot 1430 includes a secondary driver reward image 1442 for the drive mode that includes textual representations of the overall speed offset and the speed limit. The secondary driver reward image 1412 includes the word "Bonus:" before the overall speed offset of "+5 mph" to indicate the bonus status. Screen shot 1400 includes a primary driver reward image 1404 with a driver reward status indicator 1408 that indicates a full reward. Screen shot 1430 also includes an input trend image 1446 that indicates an improving trend for all inputs.

Figure 14C:
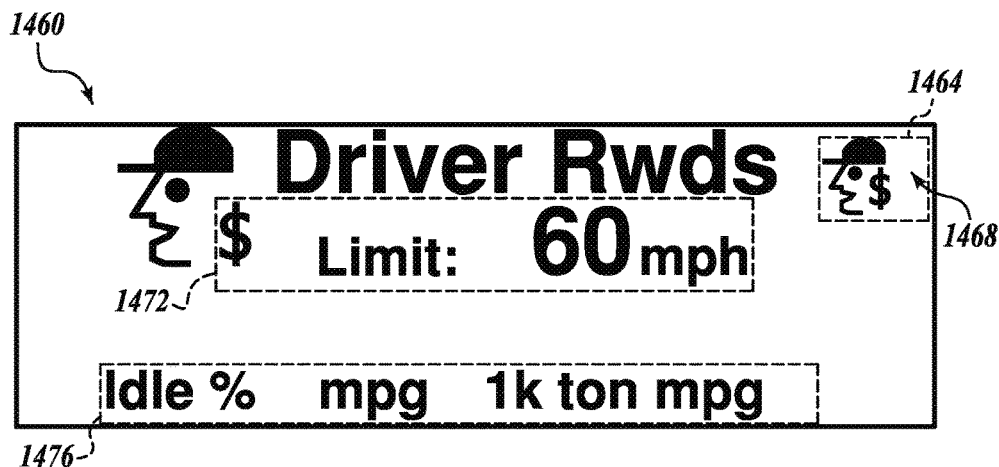
FIG. 14C is a screen shot of an exemplary secondary driver reward image indicating a neutral bonus that might be generated by the exemplary drive mode subroutine illustrated in FIG. 8.

FIG. 14C is a screen shot 1460 of another exemplary driver reward screen for the drive mode. The screen shot 1430 includes a secondary driver reward image 1472 for the drive mode that includes textual representations of the overall speed offset and the speed limit. Unlike images 14A and 14B, the secondary driver reward image 1472 does not include the word "Bonus:". Screen shot 1400 also includes a primary driver reward image 1464 with a driver reward status indicator 1468 that indicates a full reward. Screen shot 1460 shows a neutral trend 1476 for all inputs.

Figure 15A:
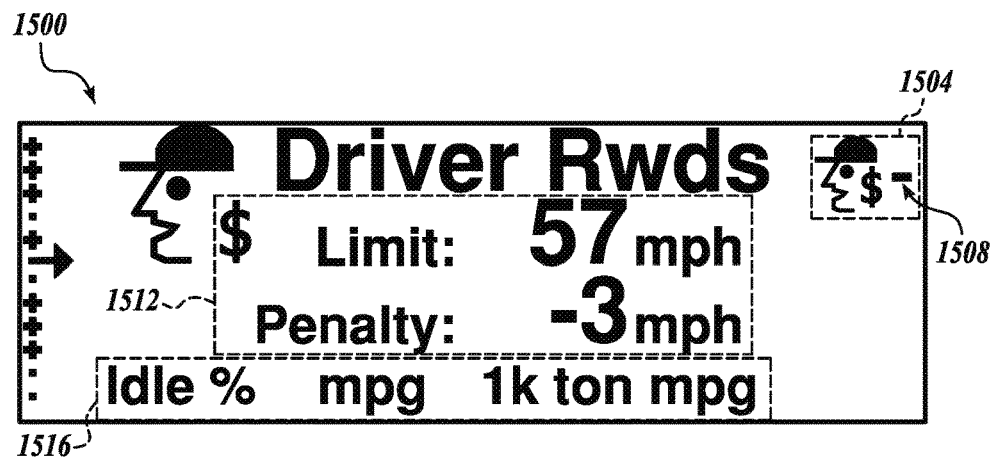
FIG. 15A is a screen shot of an exemplary secondary driver reward image indicating a partial penalty and a neutral input trend image for all inputs and a secondary driver reward image for the drive mode that might be generated by the exemplary drive mode subroutine illustrated in FIG. 8.

FIG. 15A is a screen shot 1500 of a further exemplary driver reward screen for the drive mode. The screen shot 1500 includes a secondary driver reward image 1512 for the drive mode that includes textual representations of the overall speed offset and the speed limit. The secondary driver reward image 1512 includes the word "Penalty:" to indicate a driver reward penalty is applicable as well as the amount (−3 mph) of the penalty. Screen shot 1500 also includes a primary driver reward image 1504 with a driver reward status indicator 1508 that indicates a partial penalty. Screen shot 1500 includes an input trend image 1516 indicating a neutral trend for all inputs.

Figure 15B:
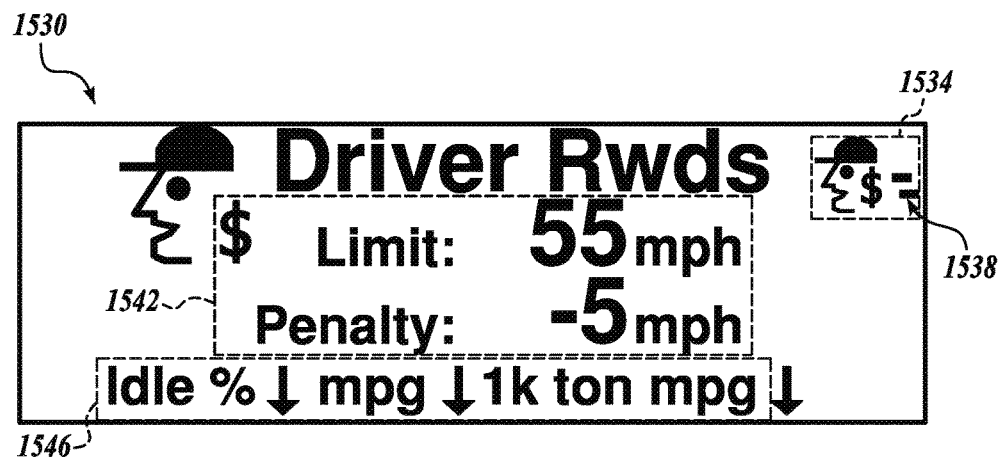
FIG. 15B is a screen shot of an exemplary secondary driver reward image indicating a full penalty and a worsening trend image for all inputs that might be generated by the exemplary drive mode subroutine illustrated in FIG. 8.

FIG. 15B is a screen shot 1530 of yet another exemplary driver reward screen for the drive mode. The screen shot 1530 includes a secondary driver reward image 1542 for the drive mode that includes textual representations of the overall speed offset and the speed limit. The secondary driver reward image 1542 includes the word "Penalty:" to indicate a penalty as well as the amount (−5 mph) of the penalty. Screen shot 1530 also includes a primary driver reward image 1534 with a driver reward status indicator 1538 that indicates a full penalty. Screen shot 1530 includes an input trend image 1546 that indicates a worsening trend for all inputs.

Figure 15C:
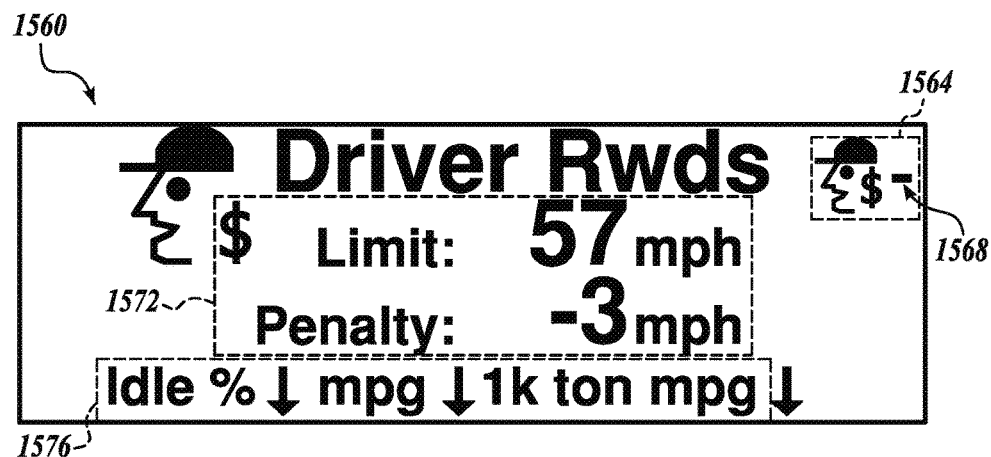
FIG. 15C is a screen shot of an exemplary secondary driver reward image indicating a partial penalty and a worsening trend for all inputs that might be generated by the exemplary drive mode subroutine illustrated in FIG. 8.

FIG. 15C is a screen shot 1560 of an exemplary driver reward screen for the drive mode. The screen shot 1560 includes a secondary driver reward image 1572 for the drive mode that includes a textual representation of the overall speed offset and the speed limit. The secondary driver reward image 1572 includes the word "Penalty:" to indicate a penalty. Screen shot 1560 includes a primary driver reward image 1564 with a driver reward status indicator 1568 that indicates a partial penalty. Screen shot 1560 includes an input trend image 1576 that indicates a worsening trend for all inputs.

FIGS. 16-20 are a variety of screen shots corresponding to different menu option selections and driver reward status indicators. FIGS. 16-20 depict images configured according to driver reward program 150 illustrated in FIG. 2 and related subroutines for display devices 160 with screens that are larger than the screens shown in FIGS. 12-15.

Figure 16B:
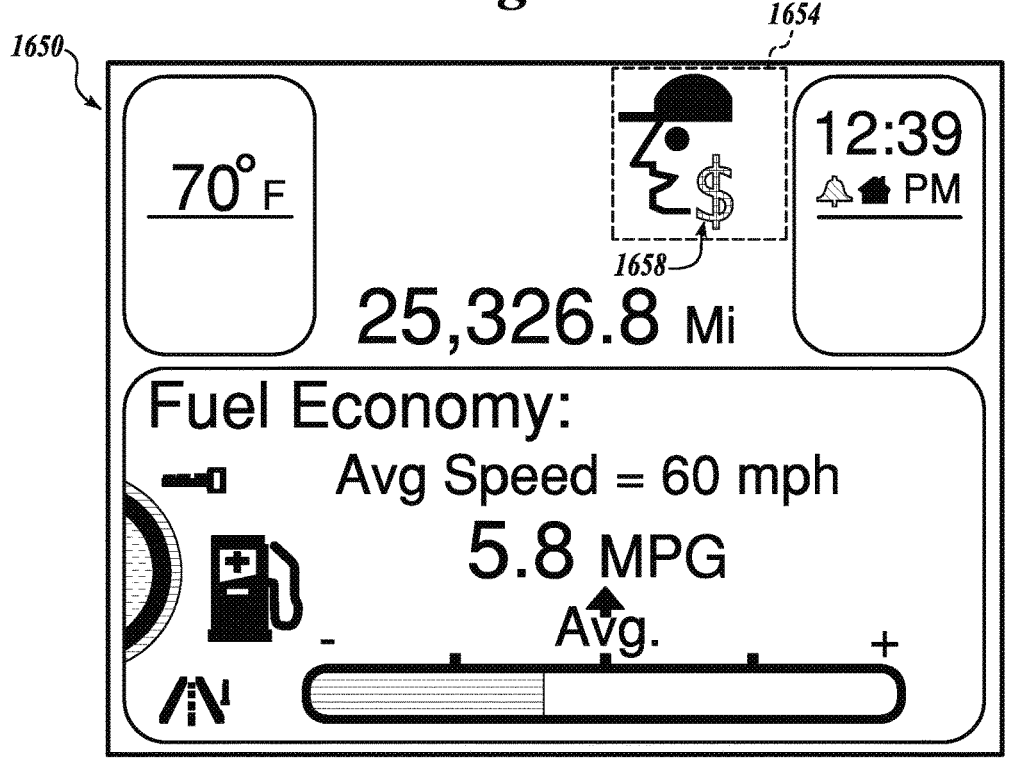
FIG. 16B is a screen shot of an exemplary fuel economy screen and a primary driver reward image indicating a partial bonus that might be generated by the exemplary process illustrated in FIG. 2.
Figure 17B:
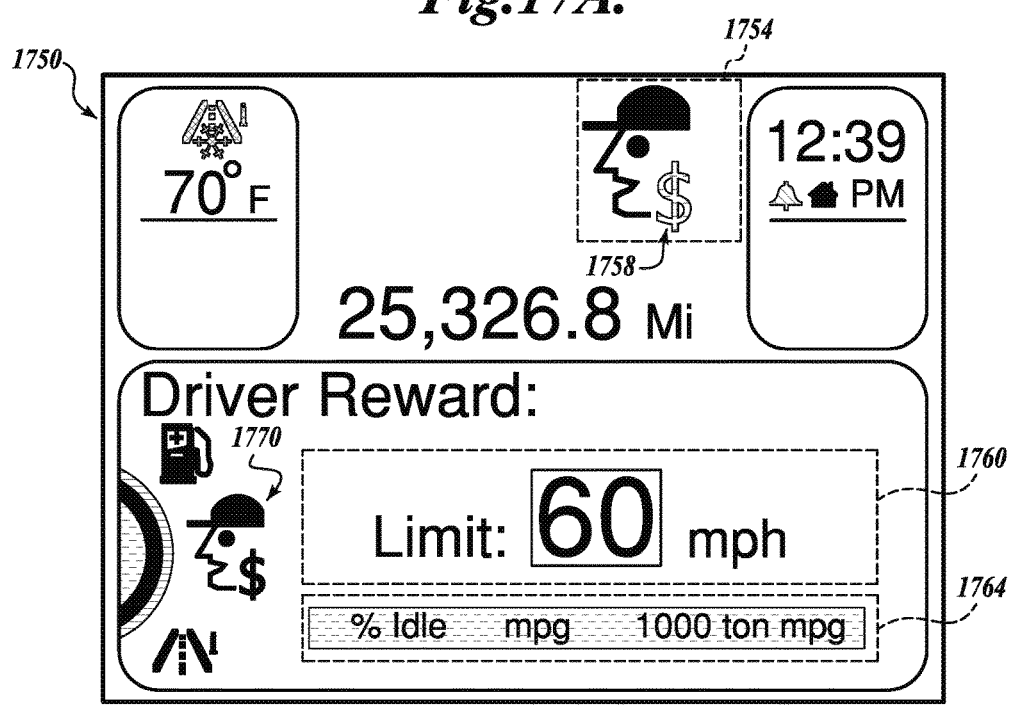
FIG. 17B is a screen shot of an exemplary secondary driver reward image for the drive mode indicating a neutral bonus, neutral input impact images, and neutral trend images that might be generated by the exemplary drive mode subroutine illustrated in FIG. 8.
Figure 18A:
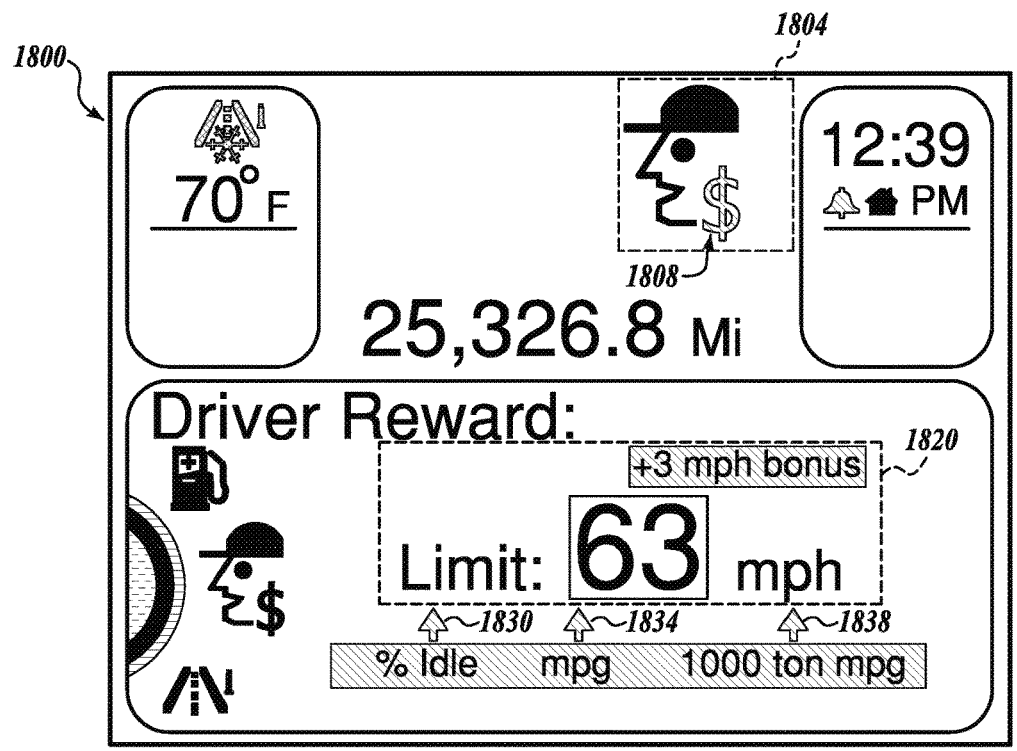
FIG. 18A is a screen shot of an exemplary secondary driver reward image for the drive mode indicating a partial bonus and an improving input trend image for all inputs that might be generated by the exemplary drive mode subroutine illustrated in FIG. 8.
Figure 18B:
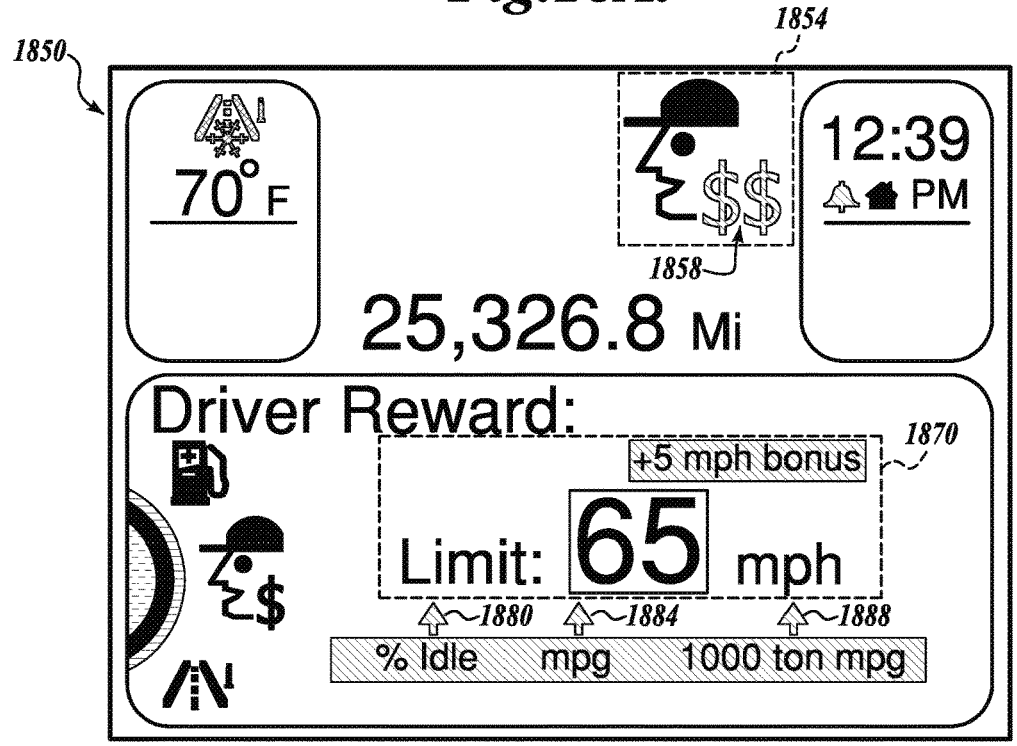
FIG. 18B is a screen shot of an exemplary secondary driver reward image for the drive mode indicating a full bonus and improving input trend image for all inputs that might be generated by the exemplary drive mode subroutine illustrated in FIG. 8.

FIGS. 17A and 17B are images generated when the vehicle is in the park mode. FIGS. 18A and 18B are images generated when the vehicle is in the drive mode. FIGS. 16A and 16B are not specific to either the drive mode or the park mode. FIGS. 16-20 allow a truck driver to quickly assess his or her driver reward score and other driver reward information regardless of whether the vehicle, i.e., the truck, is in the drive mode or the park mode.

The screenshots shown in FIGS. 16-20 use a combination of colors and symbols to provide driver reward status information. The preferred color and symbol indicators are as follows: '$$' (green)=full bonus; '$' (green)=partial bonus; '$$' (yellow) full penalty; '$' (yellow)=partial penalty; and '$' (grey) to indicate a neutral driver reward status or a driver reward level that is at the expected level. One of ordinary skill in the art will understand that other types of symbols and colors may be substituted and used as penalty/bonus status indicators. The primary driver reward image included in FIGS. 16-20 uses a relatively small amount of the overall space of the home screen. While the primary driver reward image includes a side profile of a human face; this should be also construed as exemplary and not as limiting. FIGS. 16-20 include input impact images and input trend images for the three exemplary inputs: % idle, mpg, and freight fuel. As with FIGS. 14 and 15, the input trend images use an upward pointing arrow for an improving trend, a downward pointing arrow for a worsening trend, and a no arrow for a neutral trend. Preferably, the input impact images utilize the color green to indicate that an individual input has a positive offset, yellow to indicate an input has a negative offset, and grey to indicate an input has a neutral offset. One of ordinary skill in the art will understand that other sets of combinations of symbols and colors may be substituted to indicate an improving or worsening trend or an input impact.

FIG. 16A is a generally blank home screen shot 1600 that includes an exemplary primary driver reward image 1604 and a driver reward status indicator 1608. The driver reward status indicator 1608 includes a green '$$' indicating a full bonus. If another display option is selected other than the home screen, the displayed layout may change, but the primary driver reward image 1604 remains the same.

FIG. 16B is a fuel economy screen shot 1600 that includes an exemplary primary driver reward image 1654 and a driver reward status indicator 1658. The driver reward status indicator 1658 includes a yellow '$' indicating a partial penalty. If another display option is selected other than the fuel economy option, the displayed layout may change, but the primary driver reward image 1654 remains the same.

FIG. 17A is a screen shot 1700 for the park mode driver reward display option that includes an exemplary primary driver reward image 1704 and a driver reward status indicator 1708. The driver reward status indicator 1708 includes a yellow '$' indicating a partial penalty. The screen shot 1700 includes a secondary driver reward image for the park mode 1712 and the park mode input images 1716. The secondary driver reward image for the park mode 1712 includes a textual representation of the speed limit and the overall speed offset. The secondary driver reward image 1712 for the park mode includes yellow text to indicate that the overall speed offset is below the expected level. The park mode input images 1716 use different color formatting of text to indicate whether the actual value for each input is in a bonus, penalty or neutral state. Specifically, % idle time is above the expected value, so it is colored yellow to indicate a penalty. Fuel economy is above the expected value, so it is colored green to indicate a bonus. Freight fuel is approximately equal to the expected value, so it is grey to indicate neutral status.

FIG. 17B is a screen shot 1750 for the drive mode. The screen shot 1750 includes an exemplary primary driver reward image 1754 and a driver reward status indicator 1758. The driver reward status indicator 1758 includes a grey '$' indicating a neutral bonus/penalty. The screen shot 1750 also includes a secondary driver reward image for the drive mode and other drive mode images 1760. The secondary driver reward image for the park mode 1760 includes a textual representation of the determined speed limit and the overall speed offset. As the driver reward is neutral, the offset of 0 mph is not shown. Input impact images 1764 are formatted in grey to indicate a neutral impact of each input on the overall driver reward. Display indicator 1770 has a similar side profile appearance to driver reward status indicator 1758 indicating that the driver reward display option has been selected. If a different display option has been selected, display indicator may change. For example, if a fuel economy screen is selected, display indicator may appear as a gas pump as shown in FIG. 16B.

FIG. 18A is a screen shot 1800 for the drive mode. The screen shot 1800 includes an exemplary primary driver reward image 1804 and a driver reward status indicator image 1808 indicating a partial bonus. The screen shot 1800 also includes a secondary driver reward image for the drive mode 1820 that includes a textual representation of the speed limit and the overall speed offset. A +3 mph bonus is indicated using green text in the secondary driver reward image for the drive mode. The screen shot 1800 includes upward pointing trend arrows 1830, 1834, and 1838 indicating an improving trend for % idle, mpg, and freight fuel consumption. The input impact images 1848 includes green around the name of each input to indicate that each input is at a level that is better than expected.

FIG. 18B is another screen shot 1850 for the drive mode. The screen shot 1850 includes an exemplary primary driver reward image 1804 and a driver reward status indicator image 1858 indicating a full bonus. The screen shot 1850 also includes a secondary driver reward image for the drive mode 1870 that includes a textual representation of the speed limit and the overall speed offset. A +5 mph bonus is indicated using green text in the secondary driver reward image for the drive mode. The screen shot 1850 includes upward pointing trend arrows 1880, 1884, and 1888 indicating an improving trend for all inputs. The input impact image 1848 includes green around the name of each input to indicate that each input is at a level that is better than expected.

Figure 19A:
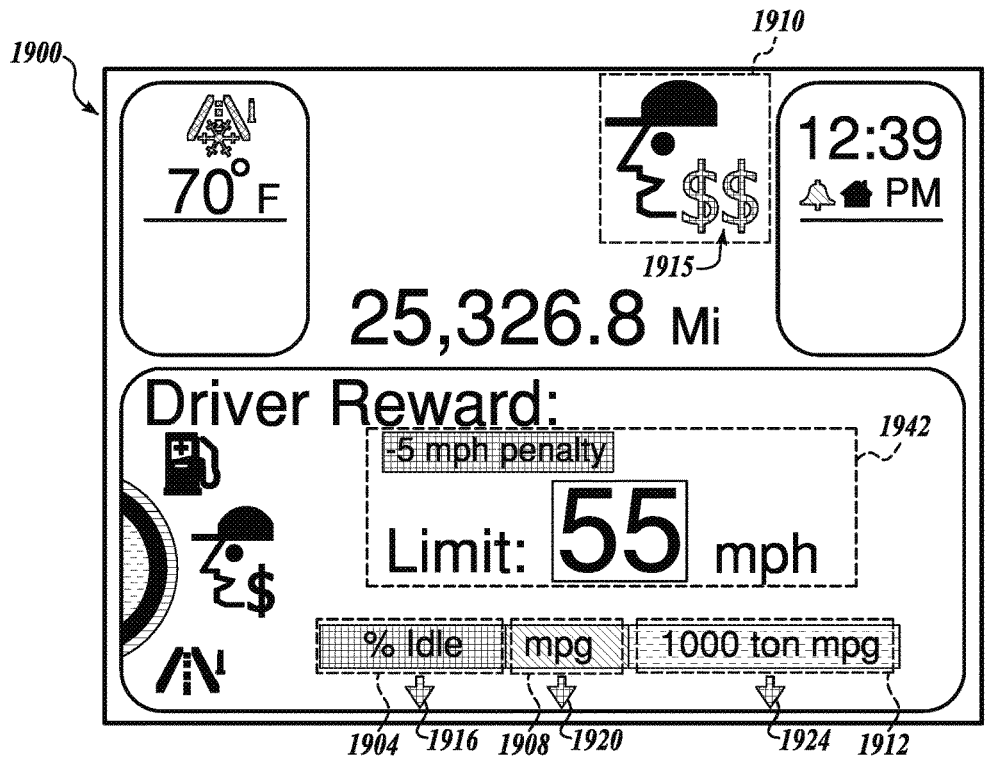
FIG. 19A is a screen shot of an exemplary secondary driver reward image for the drive mode indicating a full penalty, a worsening input trend image for all inputs, and an input impact image indicating that % idle is the limiting input that might be generated by the exemplary drive mode subroutine illustrated in FIG. 8.

FIG. 19A is a screen shot 1900 for the drive mode. The screen shot 1900 includes an exemplary primary driver reward image 1910 and a driver reward status indicator image 1915 indicating a full penalty. The screen shot 1900 also includes a secondary driver reward image for the drive mode 1942 that includes a textual representation of the speed limit and the overall speed offset. The secondary driver reward image for the drive mode includes downward pointing trend arrows 1916, 1920, and 1924 indicating a worsening trend for % idle, mpg, and freight fuel consumption. The worsening trend for the input is also indicated by the yellow color formatting of the arrows 1916, 1920, and 1924. The input impact images 1904, 1908, and 1912 include yellow, green, and grey formatting, respectively, around each input. The yellow in impact image 1904 indicates that the actual % idle input is at a level that is higher than the expected and, thus, in a penalty state. The green in impact image 1908 indicates that the mpg input is at a level that is better than the expected level and, thus, in a bonus state. The grey formatting used in impact image 1974 indicates that the freight fuel mileage is at the expected level or is neutral. Alternatively, in some embodiments, grey formatting is shown in image 1974 may be used to indicate that the input has been disabled.

Figure 19B:
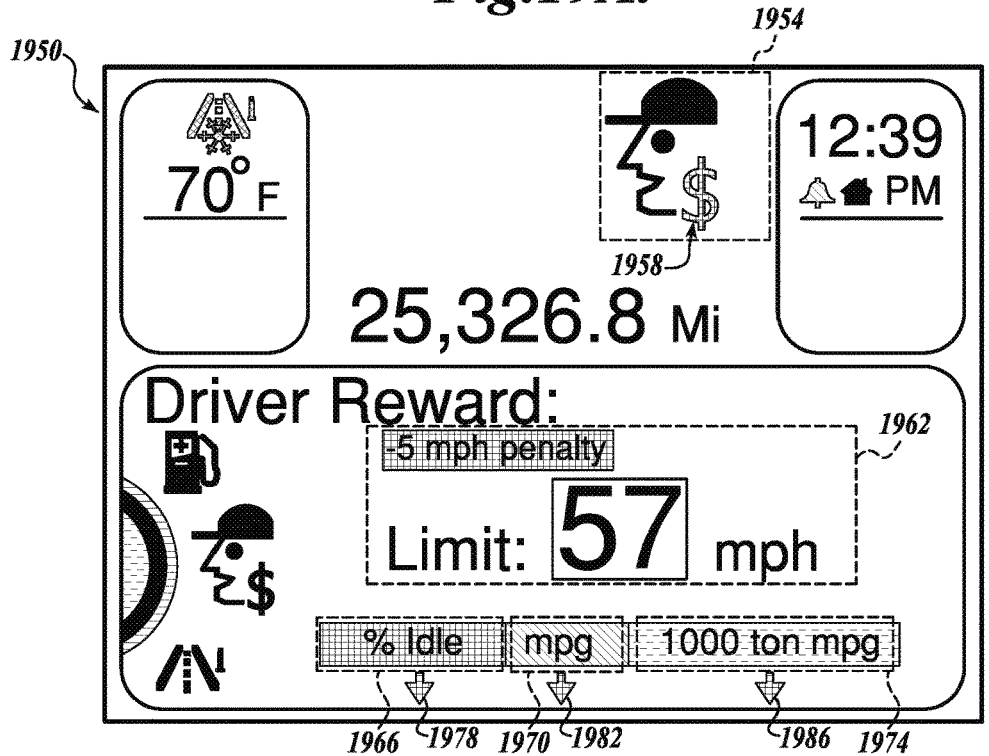
FIG. 19B is a screen shot of an exemplary secondary driver reward image for the drive mode indicating a partial penalty, a worsening input trend image for all inputs, and an input impact image indicating that the freight fuel economy input is deactivated or has a neutral impact on the overall driver reward that might be generated by the exemplary drive mode subroutine illustrated in FIG. 8.

FIG. 19B is also a screen shot 1950 for the drive mode. The screen shot 1950 includes an exemplary primary driver reward image 1954 and a driver reward status indicator image 1958 indicating a partial penalty. The screen shot 1950 also includes a secondary driver reward image for the drive mode 1962 that includes a textual representation of the speed limit and the overall speed offset. A −5 mph penalty is indicated using yellow text in the secondary driver reward image for the drive mode. The screen shot 1950 includes downward pointing trend arrows 1978, 1982, and 1986 indicating a worsening trend for the overall driver reward. The input impact images 1966, 1970, and 1974 include yellow, green, and grey formatting, respectively, around each input. The yellow in impact image 1966 indicates that the actual % idle input is at a level that is worse than expected or in the penalty. The green in impact image 1970 indicates that the mpg input is at a level that is better than the expected level and, thus, in a bonus state. The grey in image 1974 indicates that the freight fuel mileage is at the expected level and, thus, is neutral. Alternatively, in some embodiments, the grey as is shown in image 1974 may be used to indicate that the input has been disabled.

Figure 20:
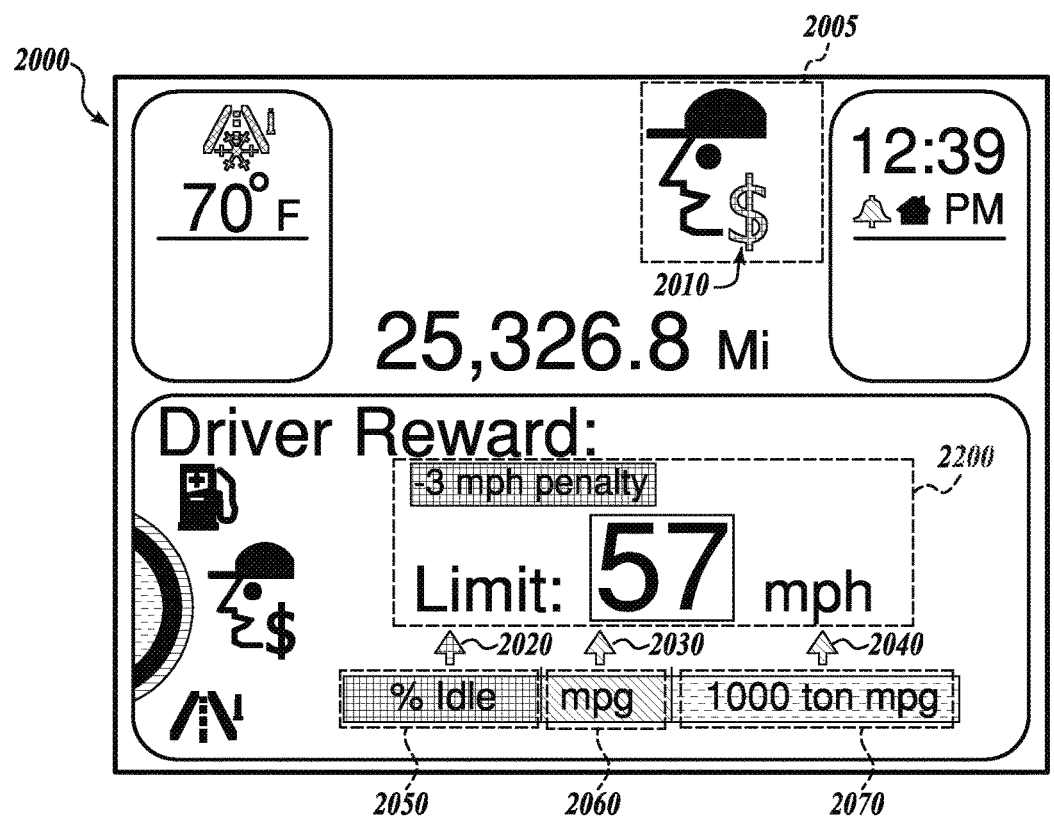
FIG. 20 is a screen shot of an exemplary secondary driver reward image for the drive mode indicating a partial penalty, an improving input trend image for all inputs, and an input impact image indicating that freight fuel is deactivated or has a neutral impact on the overall driver reward that might be generated by the exemplary drive mode subroutine illustrated in FIG. 8.

FIG. 20 is a further screen shot 2000 for the drive mode. The screen shot 2000 includes an exemplary primary driver reward image 2005 and a driver reward status indicator image 2010 indicating a partial penalty. The screen shot 2000 also includes a secondary driver reward image for the drive mode 2200 that includes a textual representation of the speed limit and the overall speed offset. A −3 mph offset and penalty is indicated using yellow text in the secondary driver reward image for the drive mode. The screen shot 2000 includes upward pointing trend arrows 2020, 2030, and 2040 indicating an improving trend for % idle, mpg, and freight fuel consumption, respectively, or an improving trend for the overall driver reward. The input impact images 2050, 2060, and 2070 include yellow, green, and grey formatting, respectively, around each input. The yellow in impact image 2050 indicates that the actual % idle input is at a level that is worse than expected and, thus, in a penalty state. The green in impact image 1908 indicates that the mpg input is at a level that is better than the expected level and, thus, in a bonus state. The grey in image 1974 indicates that the freight fuel mileage is at the expected level and, thus, is neutral. Alternatively, in some embodiments, grey as is shown in image 1974 may be used to indicate that the input has been disabled.

While illustrative embodiments have been illustrated and described, it will be appreciated that various changes can be made therein without departing from the spirit and scope of the invention.

The embodiments of the invention in which an exclusive property or privilege is claimed are defined as follows:

1. A driver reward system, wherein data associated with a driver's operation of a vehicle is collected and analyzed, the driver reward system including a processor, memory, and a display device, the driver reward system being programmed to:
   cause the processor to analyze collected driver data by comparing the collected driver data to stored data that defines expected operation of the vehicle; and
   cause results of the comparison to be displayed on the display device in a manner that provides feedback to a driver by:
      displaying, in a drive mode of operation, a bonus image including an indicator of a positive vehicle speed offset or a penalty image including an indicator of a negative vehicle speed offset, depending on the driver's operation of the vehicle;
      displaying, in a park mode of operation, a summary page that includes a vehicle speed limit and a plurality of input images that include at least some of the collected driver data used in the comparison, wherein the summary page displayed in the park mode of operation is not displayed when the vehicle is in motion, and wherein the input images displayed in the summary page include a fuel economy input image and an idle time input image.

2. The driver reward system of claim 1, wherein the bonus image further includes an indicator of a full bonus or a partial bonus, and wherein the penalty image further includes an indicator of a full penalty or a partial penalty.

3. The driver reward system of claim 1, wherein a bonus image or a penalty image is also displayed in the park mode of operation.

4. The driver reward system of claim 1, further programmed to display a trend image based at least in part on the driver's operation of the vehicle.

5. The driver reward system of claim 4, wherein the trend image includes an arrow that points in a direction based on the trend.

6. The driver reward system of claim 1, wherein at least one of the images is color-coded.

7. A non-transitory computer-readable storage medium having stored thereon executable instructions configure to cause a computer system to, at least:
   analyze collected driver data by comparing the collected driver data to stored data that defines expected operation of a vehicle; and
   display results of the comparison in a manner that provides feedback to a driver of the vehicle by:
      displaying, in a drive mode of operation, a bonus image including an indicator of a positive vehicle speed offset or a penalty image including an indicator of a negative vehicle speed offset, depending on the driver's operation of the vehicle; and
      displaying, in a park mode of operation, a summary page that includes a vehicle speed limit and a plurality of input images that include at least some of the collected driver data used in the comparison, wherein the summary page displayed in the park mode of operation is not displayed when the vehicle is in motion, and wherein the input images displayed in the summary page include a fuel economy input image and an idle time input image.

8. A computer-implemented method comprising:
   collecting driver data related to how a vehicle is being operated by a driver;
   comparing the collected driver data to stored data that defines an expected operation of the vehicle;
   displaying results of the comparison on a display device in a manner that provides feedback to a driver by:
      displaying, in a drive mode of operation, a bonus image including an indicator of a positive vehicle speed offset or a penalty image including an indicator of a negative vehicle speed offset, depending on the driver's operation of the vehicle; and
      displaying, in a park mode of operation, a summary page that includes a vehicle speed limit and a plurality of input images that include at least some of the collected driver data used in the comparison, wherein the summary page displayed in the park mode of operation is not displayed when the vehicle is in motion, and wherein the input images displayed in the summary page include a fuel economy input image and an idle time input image.

9. The method of claim 8, wherein the bonus image further includes an indicator of a full bonus or a partial bonus, and wherein the penalty image further includes an indicator of a full penalty or a partial penalty.

10. The method of claim 8, wherein a bonus image or a penalty image is also displayed on the display device in the park mode of operation.

11. The method of claim 8, further comprising displaying a trend image on the display device based at least in part on the driver's operation of the vehicle.

12. The method of claim 11, wherein the trend image includes an arrow that points in a direction based on the trend.

13. The method of claim 8, wherein at least one of the images is color-coded.

14. The method of claim 8, wherein the input images displayed in the summary page further include a freight fuel economy input image.

15. The non-transitory computer-readable storage medium of claim 7, wherein the input images displayed in the summary page further include a freight fuel economy input image.

16. The non-transitory computer-readable storage medium of claim 15, wherein the bonus image further includes an indicator of a full bonus or a partial bonus, and wherein the penalty image further includes an indicator of a full penalty or a partial penalty.

17. The non-transitory computer-readable storage medium of claim 15, wherein a bonus image or a penalty image is also displayed in the park mode of operation.

18. The non-transitory computer-readable storage medium of claim 15, wherein the instructions are further configured to cause the computer system to display a trend image based at least in part on the driver's operation of the vehicle.

19. The non-transitory computer-readable storage medium of claim 18, wherein the trend image includes an arrow that points in a direction based on the trend.

20. The non-transitory computer-readable storage medium of claim 15, wherein at least one of the images is color-coded.

21. The driver reward system of claim 1, wherein the input images displayed in the summary page further include a freight fuel economy input image.

* * * * *